(12) United States Patent
Kuznetcov et al.

(10) Patent No.: US 12,196,696 B2
(45) Date of Patent: Jan. 14, 2025

(54) APPARATUS AND METHODS FOR DETERMINING THE RESPONSES OF MATERIALS AT ELEVATED THERMOBARIC CONDITIONS

(71) Applicant: PERM Inc., Calgary (CA)

(72) Inventors: Ilia Kuznetcov, Calgary (CA); Apostolos Kantzas, Calgary (CA)

(73) Assignee: PERM Inc., Calgary (CA)

( * ) Notice: Subject to any disclaimer, the term of this patent is extended or adjusted under 35 U.S.C. 154(b) by 241 days.

(21) Appl. No.: 17/953,592

(22) Filed: Sep. 27, 2022

(65) Prior Publication Data

US 2023/0095025 A1 Mar. 30, 2023

Related U.S. Application Data

(60) Provisional application No. 63/248,798, filed on Sep. 27, 2021.

(51) Int. Cl.
*G01R 27/02* (2006.01)
*E21B 43/24* (2006.01)
(Continued)

(52) U.S. Cl.
CPC .................. *G01N 27/026* (2013.01)

(58) Field of Classification Search
CPC ........ G01N 27/02; G01N 22/04; G01N 15/08; E21B 43/24; G01R 27/02; G01R 27/32; G01V 3/00
See application file for complete search history.

(56) References Cited

U.S. PATENT DOCUMENTS 6,614,647 B2 9/2003 Kamath
8,642,287 B2 * 2/2014 Wang ................... G01N 27/221
703/2
(Continued)

FOREIGN PATENT DOCUMENTS

WO 2021176982 A1 9/2020

OTHER PUBLICATIONS

I. Kuznetcov, A. Kantzas, S. Bryant, Electro-acoustic excitation of the interface, Advances in colloid and interface science 283 (2020) 102217, available at: https://doi.org/10.1016/j.cis.2020.102217.
(Continued)

*Primary Examiner* — Neel D Shah
(74) *Attorney, Agent, or Firm* — Christopher M. Scherer; DeWitt LLP

(57) ABSTRACT

Apparatus and methods for determining the impedance spectrum of materials at elevated thermobaric conditions. The apparatus comprises a pair of electrodes in a sample chamber. The sample may be conditioned within the sample chamber by the application of heat and/or pressure. A controller applies alternating voltages across the terminals at a range of different frequencies and processes the frequency response of the sample to determine the impedance spectrum of the sample. By empirically determining the frequency spectrum of the dielectric properties (relative dielectric constant and conductivity) from the measured impedance spectrum at various temperatures and pressures, the effectiveness of electromagnetic heating in extreme environments (e.g., within an oil reservoir) can be determined.

21 Claims, 38 Drawing Sheets

(51) Int. Cl.
*G01N 15/08* (2006.01)
*G01N 22/04* (2006.01)
*G01N 27/02* (2006.01)
*G01R 27/32* (2006.01)
*G01V 3/00* (2006.01)

(56) References Cited

U.S. PATENT DOCUMENTS

2005/0199386 A1* 9/2005 Kinzer .................. H05B 6/50
 166/250.15
2013/0002258 A1* 1/2013 Ligneul ................ E21B 47/06
 324/376
2021/0208052 A1 7/2021 Kuznetcov et al.

OTHER PUBLICATIONS

T.M. Abraham, Conduction and dielectric relaxation mechanisms in oil sands influencing electrical heating, Alberta, Canada, 2016.
K. Technologies, Keysight 16452A Liquid Test Fixture: Operation and Service Manual, 6th ed., Keysight Technologies, 2019.
F.S. Chute, F.E. Vermeulen, M.R. Cervenan, F.J. McVea, Electrical properties of Athabasca oil sands, Canadian Journal of Earth Sciences 16 (1979) 2009-2021.
Keysight Technologies, Accessories catalog for impedance measurements—catalog (2017).
Agilent, Impedance measurement handbook, 4th ed., Agilent Technologies, 2009.
OMICRON Lab, Bode 100: User manual, OMICRON Lab.
P.R.J. Connolly, M. Josh, K.T. O'Neill, S.J. Seltzer, M.O. Wigand, M.B. Clennell, E.F. May, M.L. Johns, Dielectric polarization studies in partially saturated shale cores, J. Geophys. Res. Solid Earth 124 (2019) 10721-10734. Available at: https://doi.org/10.1029/2019JB018195.
B.A. Mazzeo, A.J. Flewitt, Two- and four-electrode, wide-bandwidth, dielectric spectrometer for conductive liquids: Theory, limitations, and experiment, Journal of Applied Physics 102 (2007) 104106. Available at: https://doi.org/10.1063/1.2815666.
A.D. Hollingsworth, D.A. Sville, PII: S0021-9797(02)00029-2A broad frequency range dielectric spectrometer for colloidal suspensions: cell design, calibration, and validation, Journal of colloid and interface science 257 (2003) 56-76.
T. Schuster, F. Hammerle, Impedance measurements using the Bode 100, 2020.
G. Sutorius, Challenges and solutions for impedance measurements. Keysight Technologies, Basics of measuring the dielectric properties of materials—application note (2017).
T. Bittner, M. Bajodek, T. Bore, E. Vourc'h, A. Scheuermann, Determination of the Porosity Distribution during an Erosion Test Using a Coaxial Line Cell, Sensors (Basel, Switzerland) 19 (2019). https://doi.org/10.3390/s19030611.
C.G. Essex, G.P. South, R.J. Sheppard, E.H. Grant, A bridge technique for measuring the permittivity of a biological solution between 1 and 100 MHz, Journal of Physics E: Scientific Instruments 8 (1975) 385-389.
J.C. Moore, High-resolution dielectric profiling of ice cores, Journal of Glaciology 39 (1993) 245-248.
J. Moore, N. Maeno (Eds.), Application of the dielectric profiling technique to ice core studies, 1991.
J.C. Moore, R. Mulvaney, J.G. Paren, Dielectric stratigraphy of ice: A new technique for determining total ionic concentrations in polar ice cores, Geophysical Research Letters 16 (1989) 1177-1180.
Tirado, Arroyo, Delgado, Grosse, Measurement of the Low-Frequency Dielectric Properties of Colloidal Suspensions: Comparison between Different Methods, Journal of colloid and interface science 227 (2000) 141-146. Available at: https://doi.org/10.1006/jcis.2000.
H. Wakamatsu, A dielectric spectrometer for liquid using the electromagnetic induction method, Hewlett Packard Journal 48 (1997) 37-44.
F. Wilhelms, J. Kipfstuhl, H. Miller, K. Heinloth, J. Firestone, Precise dielectric profiling of ice cores: a new device with improved guarding and its theory, Journal of Glaciology 44 (1998) 171-174.
F. Wilhelms, Messung dielektrischer Eigenschaften polarer Eiskerne; Measuring the Conductivity and Density of Ice Cores, Ber. Polarforsch 191 (1996).

* cited by examiner

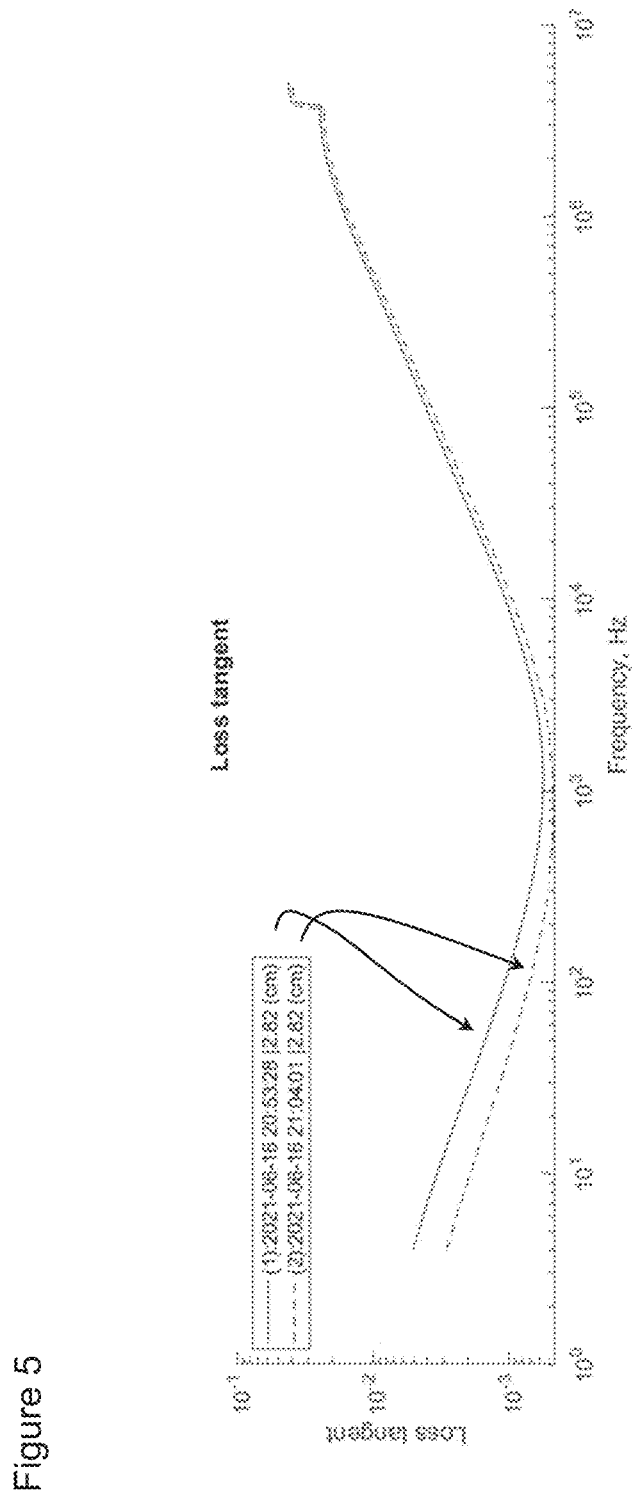

APPARATUS AND METHODS FOR DETERMINING THE RESPONSES OF MATERIALS AT ELEVATED THERMOBARIC CONDITIONS

CROSS-REFERENCE TO RELATED APPLICATIONS

This application claims priority to U.S. Provisional Application No. 63/248,798, filed Sep. 27, 2021, the contents of which are incorporated herein by reference in their entireties.

FIELD

The invention relates to apparatus and methods for determining the responses of materials at elevated thermobaric conditions. In particular, the invention relates to determining the complex impedance and/or dielectric frequency responses of materials under various conditions including different temperatures, different pressures, and/or different flow conditions.

BACKGROUND

Steam-Assisted Gravity Drainage (SAGD) is an enhanced oil recovery technology for producing heavy crude oil and bitumen. It is an advanced form of steam stimulation in which a pair of horizontal wells is drilled into the oil reservoir, one a few metres above the other. Steam is injected into the formation via one well in order to mobilise hydrocarbon deposits (typically viscous heavy oil and bitumen), which are recovered via the second well.

Electro-Magnetic (EM) heating involves mobilizing the hydrocarbon deposits by irradiating the formation with electromagnetic waves generated by antennas, and then recovering the mobilised hydrocarbons via a recovery well. EM heating technology applied to oil recovery has been explored since mid-1900s, however it has not been adopted as widely as the Steam-Assisted Gravity Drainage (SAGD) technique due to lack of understanding of the physical mechanisms behind it.

The main advantages of the EM heating over the more traditional and commonly used SAGD lies in its independence of water, low carbon footprint and its ability to heat thin oil-bearing formations.

WO 2020/176982 discloses an apparatus and method for electromagnetic heating of a hydrocarbon formation. The apparatus includes an electrical power source; at least one electromagnetic wave generator for generating alternating current; at least two transmission line conductors positioned in the hydrocarbon formation; at least one waveguide for carrying the alternating current from the at least one electromagnetic wave generator to the at least two transmission line conductors; and a producer well to receive heated hydrocarbons from the hydrocarbon formation. The transmission line conductors are excitable by the alternating current to propagate a travelling wave within the hydrocarbon formation. At least one of the transmission line conductors include a primary arm and at least one secondary arm extending laterally from the primary arm. The at least one secondary arm includes at least one electrically isolatable connection for electrically isolating at least a portion of the secondary arm.

The oil reservoir fluid composition and saturation, the salt content in the reservoir fluids, the reservoir fluid phase state and the reservoir fluid spatial distribution strongly affect the wave propagation of the electromagnetic energy. There have been many efforts in modelling and predicting the EM heating of oil-bearing reservoirs, however these studies overlook the phenomena that occur right next to the heating antenna. These effects are represented mainly by the electrode polarization and are especially pronounced at frequencies lower than 1 MHz, where the majority of the past the EM heating pilots operate due to higher penetration depths of the EM field (Kuznetcov, I. et al., "Electro-acoustic excitation of the interface", Advances in Colloid and Interface Science 283 (2020) 102217).

The so-called dissection zone has also yet to be explored experimentally. The dissection zone appears when the reservoir fluids turn into vapor due to the EM wave absorption by the reservoir fluids, which in turn changes the EM wave penetration depths due to changes in the complex dielectric frequency responses.

Of the impedance cells reported in the literature, some are commercial (e.g., Keysight™ 16452A Liquid Test Fixture), and some were developed for industrial work (Chute F. S. et al., "Electrical properties of Athabasca Oil Sands", Can. J. Earth Sci., 16.2009-2021 (1979)). These existing impedance cells operate only at ambient or moderate conditions—up to 150° C., while being open to the atmosphere (P=1 atm or 0.1 MPa).

SUMMARY

In accordance with a first aspect of the present disclosure, there is provided an apparatus for determining the impedance spectrum of a sample, the apparatus comprising:
- a pair of electrodes, each electrode having a conducting surface;
- a sample chamber configured to hold a sample between the conducting surfaces;
- a conditioning system for applying a pressure to the sample; and
- a controller configured to apply voltages across the conducting surfaces at a range of different frequencies and to process the frequency response of the sample to determine the impedance spectrum of the sample.

The controller may comprise an impedance analyzer.

The controller may comprise at least one of: direct current-voltage impedance analyzer; and an auto-balanced bridge impedance analyzer.

The apparatus may be configured to measure the impedance of the sample at frequencies less than 1 MHz. The apparatus may be configured to measure the impedance of the sample at frequencies greater than 1 kHz.

The controller and electrodes may act as a heater by applying alternating current though the sample via the pair of electrodes.

The heater may have a power output of between 1 kW-10 kW.

The sample chamber may be configured to support pressures of over 10 MPa. The sample chamber may be configured to support pressures of up to 100 MPa.

The electrodes may form at least part of the walls of the sample chamber.

The pair of electrodes may comprise parallel plate electrodes arranged at either end of the sample chamber. The plates may be flat. The plates may be circular.

In a parallel plate embodiment, the sample chamber walls may be formed by cylindrical portions which may be added or removed in order to change the inter-electrode spacing.

Seals (e.g., O-rings or gaskets) may be used between these cylindrical portions to maintain pressure within the sample chamber.

The pair of electrodes may be adjustable to change the distance between the conducting surfaces.

The pair of electrodes may comprise a cylindrical electrode (e.g., with a uniform circular cross section) and an axially located elongate electrode. The outer surface of the elongate electrode may be in the form of a cylinder with a uniform circular cross section. The inter-electrode spacing may be changed by replacing the inner (or outer) electrode with another electrode with a different radial dimension.

Each electrode may be housed within an electrically insulated piston, the pistons being configured to be moveable along an axis transverse to the conducing surfaces.

The sample chamber may comprise an inlet and an outlet to allow fluid to be circulated through the sample.

The conditioning system may comprise one or more overburden chambers, each overburden chamber being positioned adjacent to a moveable wall of the sample chamber, such that when the overburden chamber is filled, a pressure is applied within the sample chamber by moving the moveable wall.

The conditioning system may comprise a moveable wall forming part of the sample chamber and a hydraulic actuator configured to move the moveable wall to apply an overburden pressure to the sample within the sample chamber.

The conditioning system may comprise a heater for heating the sample.

According to a further aspect, there is provided a method of determining an impedance spectrum of a sample using the apparatus described herein, the method comprising:
 inserting a sample between the conducting surfaces of a pair of electrodes;
 heating the sample using the heater;
 applying a pressure to the sample using the pressurizer;
 using the controller to apply alternating voltages across the conducting surfaces at a range of different frequencies; and
 using the controller to process the frequency response of the sample to determine the impedance spectrum of the sample.

The method may comprise changing the distance between the conducting surfaces to a new inter-surface distance and reapplying the alternating voltages and re-determining the impedance spectrum of the sample for the new inter-surface distance.

The method may comprise recycling fluids through the sample and continuously reapplying the alternating voltages and re-determining the impedance spectrum of the sample.

The method may comprise changing the temperature and pressure of the sample and continuously reapplying the alternating voltages and re-determining the impedance spectrum of the sample.

The method may comprise injecting different fluids into a porous solid sample and continuously reapplying the alternating voltages and re-determining the impedance spectrum of the sample with different fluids.

The method may comprise measuring and online monitoring the hysteresis in the pressure and temperature dependent relative dielectric constant and conductivity frequency responses of samples.

The method may comprise calculating and online monitoring electrode polarization effects in the parallel plate impedance cell.

The PEEK plugs/pistons in the coaxial impedance cell may be made from other non-conductive and chemically and stress resistant materials (e.g., Teflon, Duratron, Polysulfuone, Polyetherimide, Poyethersulfone etc.).

The PEEK ring insets in the parallel plate impedance cell may be made from other non-conductive and chemically and stress resistant materials (e.g., Teflon, Duratron, Polysulfuone, Polyetherimide, Poyethersulfone etc.).

The material for the electrodes of the impedance cells may be changed to other metals (e.g. comprising iron, such as steel, or nickel) and alloys such as aluminum and its alloys (e.g., aluminum alloy 6061). Aluminum and its alloys may act as a catalyst when in contact with oil sand and the high-power (above 0.5 kW) electric field is generated across the impedance cell. This may result in the hydrogen production and in changes to the measured impedance frequency responses. The material for the electrodes may be changed in both the coaxial and the parallel plate impedance cells geometries.

The walls may be thickened for the parts that are pressurized to increase the pressure ratings of the impedance cells.

It is possible to change the material of the parts that are in contact with the working fluid to other, more chemically resistant materials. For example, the stainless steel 316 and the aluminum alloy may be replaced by an acid-resistant material, such as Hastelloy (nickel-molybdenum alloy). This may be important if, e.g., the kinetics of the injection of acid into a carbonate reservoir needs to be measured/studied. Then, the impedance measurements may be conducted on this carbonate rock, that undergoes acid treatment, to capture the process of its decomposition.

Stub ACME threads on the threaded shaft and the wheel ring in the parallel plate impedance cell may be made finer to achieve a finer tuning of the dynamic electrode piston displacement.

The polymer material of the O-rings and the packers for the coaxial cable pairs may be changed from Viton to, e.g., Aflas or Kalrez to achieve higher temperature performance.

The material for the sleeve in the coaxial impedance cell may be changed to metal, so that it does not interfere with the impedance measurements (corresponding adaptations to the equivalent circuit for the dielectric parameter retrieval would also be required).

The threaded connections of the top and bottom caps to the central section of the parallel plate impedance cell could be replaced by another connector (e.g. flanged connection).

The main chamber of the coaxial impedance cell and the parallel plate impedance cell may be elongated to meet sample's length requirements. The sample length may be up to 30 cm and/or 20 cm in diameter. The sample may be at least 10 cm in length and/or 5 cm in diameter.

The diameter of both impedance cells, along with their plugs, inserts and electrodes may be changed to meet sample's diameter requirements.

A vector network analyzer may be connected to the coaxial impedance cell to monitor saturation profiles.

An electromagnetic generator may be connected to the electrodes to allow simultaneous electromagnetic heating, while measuring the impedance frequency responses of the samples.

The parallel plate impedance cell may be configured to provide variable electrode spacing.

The sample chamber may be configured to withstand temperatures of more than 200° C. The sample chamber may be configured to withstand temperatures of more than 350° C. (adaptation of the higher temperature rated materials used for the seals and pistons plugs may be required).

The apparatus may be configured to enable indirect measurement of the electrode polarization effects, while measuring the impedance of the sample at two distinct arbitrary electrode spacing distances, by using the parallel plate impedance cell and its dynamic electrode feature.

The apparatus may be configured to enable complex impedance measurements, while being able to heat the sample using electromagnetic radiation via e.g., an electromagnetic power generator (inverter), that supplies the signal of various power and frequency levels.

The apparatus may be configured to enable complex impedance measurements of various sample's lengths, thicknesses, and geometries, that fit the coaxial and parallel plate cells.

The apparatus may be configured to enable monitoring and capturing kinetics of diffusion and dispersion processes, phase change in fluid and solid samples, chemical reactions, and other dynamic physiochemical processes in the samples under test.

The apparatus may be configured to enable online measuring and logging the complex impedance and dielectric permittivity frequency responses of liquid, solid and gaseous samples at various thermobaric conditions (e.g., up to a maximum pressure of 60 MPa and temperatures above 350° C. (adaptation of the higher temperature rated materials used for the seals and pistons plugs is required). These limits can be changed by changing materials and wall thickness of the parts that make the sample holding chamber in both cells).

The apparatus may be configured to enable monitoring the development of the dissection zone, that develops, when the sample's fluid undergoes phase transition, started by heating the sample with electromagnetic radiation via the electromagnetic power generator (inverter).

The apparatus may be configured to enable the application both coaxial and radial overburden pressure to the sample under test in a controlled way, while conducting impedance measurements.

The apparatus may be configured to enable changing the electrode spacing, while measuring and logging the complex impedance frequency responses of the sample under test, without interrupting the test.

The apparatus may be configured to enable conducting impedance measurements of the sample, while performing determination of the spatial distribution of its constituents of distinct conductivity and/or permittivity (e.g., as described in US 2021/0208052 A1).

The apparatus may be configured to enable conducting impedance measurements, while allowing fluid to flow through the cell and the batch type impedance measurements, with only one side of the sample exposed.

The apparatus may be configured to enable conducting impedance measurement of reservoir and rock samples under realistic reservoir conditions. These conditions include elevated temperatures and pressures, appearance of the dissection zone, reservoir fluid migration and its phase change, injection of various solvents, polymers, foams, and other fluid composition with and without nanoparticles and other surface agents to increase oil production and the reservoir sweep efficiency.

The apparatus may be configured to enable both impedance cells to simultaneously be served as the applicators of electromagnetic energy (e.g. simultaneously connected to the power generator to irradiate the sample packed in them)).

The apparatus may be configured to enable conducting impedance measurements under all the conditions described above simultaneously, while monitoring and logging sample's temperature and pressure, the overburden pressure, the pressure of the produced gases.

The apparatus may be configured to enable the cell to measure concentration of colloidal particles (such as biological cells suspended in another liquid phase, such as water, emulsions, suspensions of particles of various size including nanoparticles etc.) in fluids over time (gases, liquids, and their mixtures) at various thermobaric conditions, with and without the flow.

The present technology can be used to measure dielectric properties of an oil reservoir under realistic pressure and temperature conditions.

The apparatus may allow simultaneous fluid flow through a sample under test, while measuring the complex impedance and dielectric frequency responses. This scenario is useful in investigating a simultaneous solvent injection and the EM heating process. For example, it may be possible to try different fluid mixes within a sample to determine which solvent would be most effective at mobilizing heavy hydrocarbons based on how they change the effectiveness of the heating protocol.

The apparatus may be configured to have a variable spacing capability and the capabilities of applying the radial and axial overburden stresses onto a sample under test, while measuring the impedance frequency responses.

The apparatus may allow for a simultaneous heating via heat conduction (heating tape or bath) and the internal electromagnetic heating (via an externally connected power generator/inverter), while measuring the complex impedance and dielectric responses.

The apparatus may allow for the estimation of the electrode polarization effects. In our experiment we also observed that the dielectric properties are strongly dependent on the overburden stresses, which have never been accounted for in any of the dielectric measurements to date.

The apparatus may have a dynamic electrode that is allowed to move axially along its chamber to control the stress that electrodes exert onto the sample. The overburden stress can also be controlled by a pump connected to the parallel plate impedance cell through the transfer cylinder filled with a non-conductive fluid (e.g., vegetable oil).

An impedance analyzer is a type of electronic test equipment used to measure complex electrical impedance as a function of test frequency. A vector network analyzer (VNA) can be considered a distinct instrument from an impedance analyzer. In contrast to impedance analyzers, VNAs also measure impedance but usually at much higher frequencies and with much lower accuracy compared to impedance analyzers. Impedance analyzers typically offer highly accurate impedance measurements, e.g., with a basic accuracy of 1% or less.

BRIEF DESCRIPTION OF THE DRAWINGS

Various objects, features and advantages of the invention will be apparent from the following description of particular embodiments of the invention, as illustrated in the accompanying drawings. The drawings are not necessarily to scale, emphasis instead being placed upon illustrating the principles of various embodiments of the invention. Similar reference numerals indicate similar components.

FIG. 1c is a cross-section view of the parallel plate impedance cell of FIG. 1a.

FIG. 2b is side view and a corresponding cross-section view of the sample assembly of FIG. 2a.

FIG. 5 is a graph of the loss tangent as a function of frequency for a particular sample at two different times.

DETAILED DESCRIPTION

Introduction

Figure 1A:
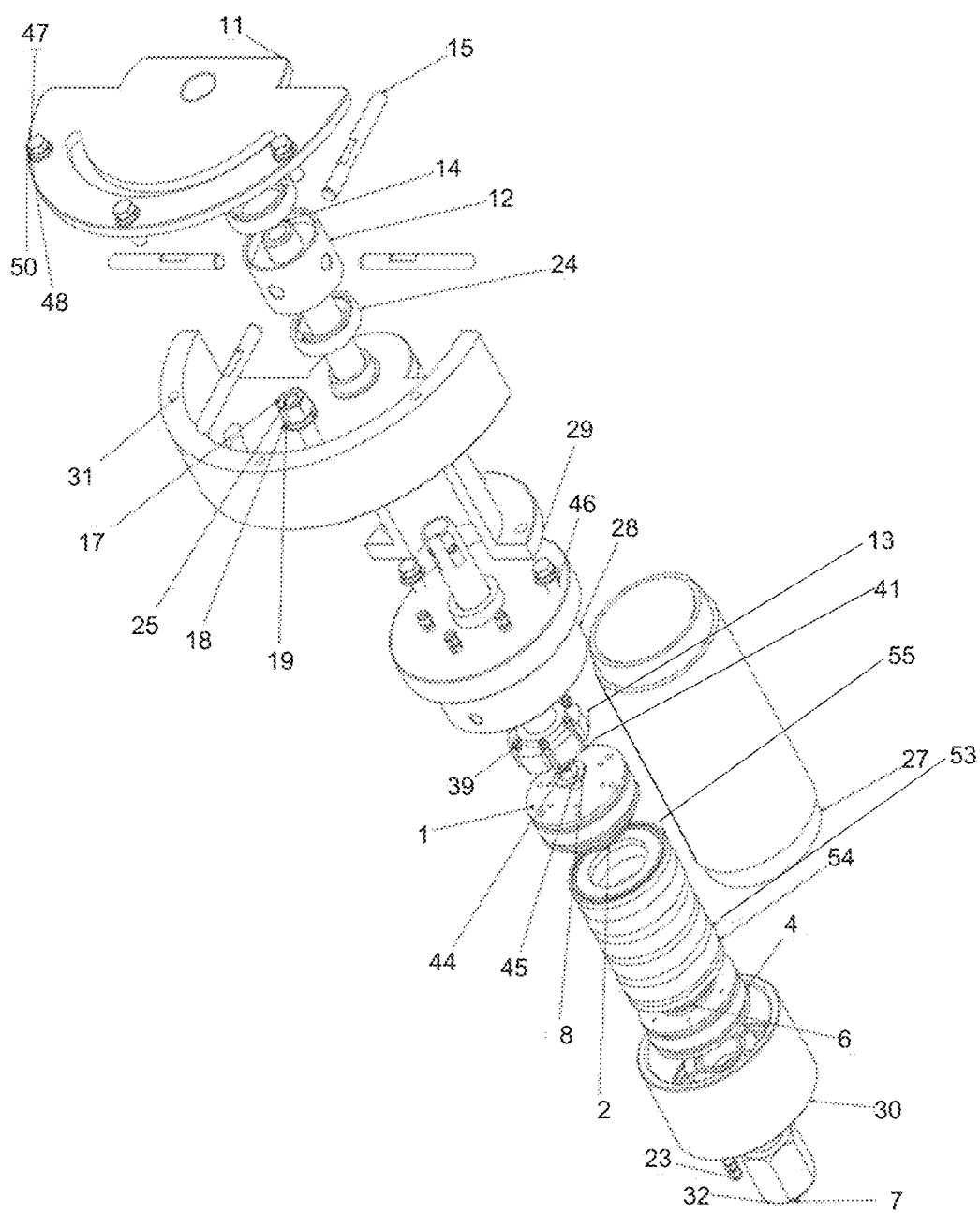
FIGS. 1a and 1b are exploded views of an embodiment comprising a parallel plate impedance cell.

To effectively determine the effects of an electromagnetic heating process, for example in situ downhole in an oil reservoir, it is important to have dielectric constant and conductivity (the complex dielectric frequency responses) measurements of a sample of the formation performed at the expected EM frequencies at which the EM heating would be conducted. It is also important to capture these complex dielectric frequency responses as a function of these various reservoir conditions, that change during the EM heating process.

This disclosure relates to apparatus and methods for measuring and determining complex impedance and/or dielectric responses of various materials at elevated thermobaric conditions. Multiple configurations are envisaged, including those with parallel plate electrodes and those with coaxial electrodes. The conducting surfaces of the electrodes are configured to probe the sample with a range of voltage frequencies, and measure the responses. The resulting impedance and dielectric responses are useful at predicting and optimizing the effectiveness of electromagnetic (EM) heating of materials.

One application in which optimizing the effectiveness of electromagnetic (EM) heating is important is the heating of hydrocarbon reservoirs (including oil sands) to mobilise carbon reserves for extraction. The dielectric properties of oil sands (and other materials) are essential for describing propagation of electromagnetic waves, which in turn can provide insights into how best to heat the formation/hydrocarbons using EM radiation. Apparatus according to the present disclosure allows for measurements of the complex impedance and dielectric frequency responses/spectra of the reservoir rocks at the reservoir thermobaric (i.e. temperature and pressure) conditions. Replicating the reservoir conditions is important to provide a more direct evaluation of how a particular heating protocol would work in the reservoir.

Apparatus and methods according to the present disclosure also enable simultaneous heating (e.g., by the EM generator at various frequencies and/or by a heating tape via heat conduction), while measuring the impedance and dielectric frequency responses of the reservoir rocks and other materials.

The dynamic electrode in the parallel plate impedance cell allows for testing different electrode spacings (equivalent to the spacing between the EM well pair), behaviour of the dissection zone and the electrode polarization.

Apparatus and methods according to the present disclosure also enables investigation of the simultaneous solvent injection along with the EM heating to stimulate the oil recovery from the oil-bearing rocks. For example, on aspect of the present invention is circulating different liquids (e.g., solvents) and measuring how this might affect the EM heating. In this way, the solvents and EM heating parameters can be improved or optimised to improve hydrocarbon recovery.

Apparatus and methods according to the present disclosure also enable measurements of the impedance and dielectric frequency responses of various reservoir rocks and other materials (liquids, solids, gases, and their mixtures) at various thermobaric conditions, while also allowing for the electrode polarization removal, EM and heat conduction heating and overburden stresses.

This technology is not limited to only EM heating of oil sands, but it can also be applied to characterizing kinetics of various electrochemical and physical processes such as diffusion, dispersion, chemical reactions, phase change behavior in fluids at various temperature and pressure conditions. Another important feature is that it allows simultaneous EM heating while measuring the complex impedance and dielectric frequency responses.

Various aspects of the invention will now be described with reference to the figures. For the purposes of illustration, components depicted in the figures are not necessarily drawn to scale. Instead, emphasis is placed on highlighting the various contributions of the components to the functionality of various aspects of the invention. A number of possible alternative features are introduced during the course of this description. It is to be understood that, according to the knowledge and judgment of persons skilled in the art, such alternative features may be substituted in various combinations to arrive at different embodiments of the present invention.

Parallel Plate Apparatus

Figure 1B:
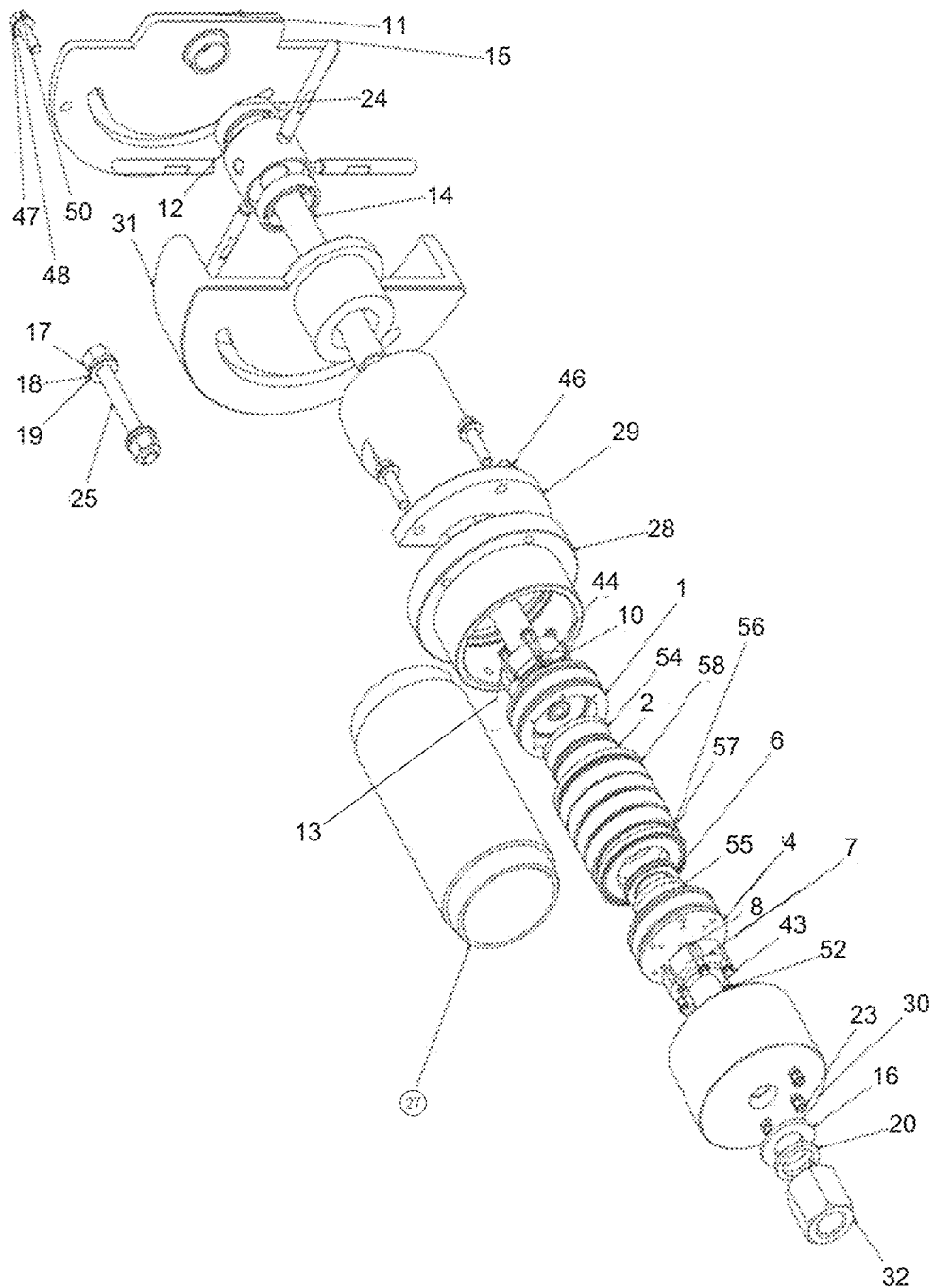

FIGS. 1a-b are exploded views of a parallel plate impedance cell apparatus for determining the impedance spectrum of a sample, the apparatus comprising:
- a pair of electrodes 2,6, each electrode having a conducting surface;
- a sample chamber configured to hold a sample between the conducting surfaces;
- a conditioning system for applying a pressure to the sample within the sample chamber; and
- a controller configured to apply alternating voltages across the conducting surfaces at a range of different frequencies and to process the frequency response of the sample to determine the impedance spectrum of the sample.

Figure 1C:
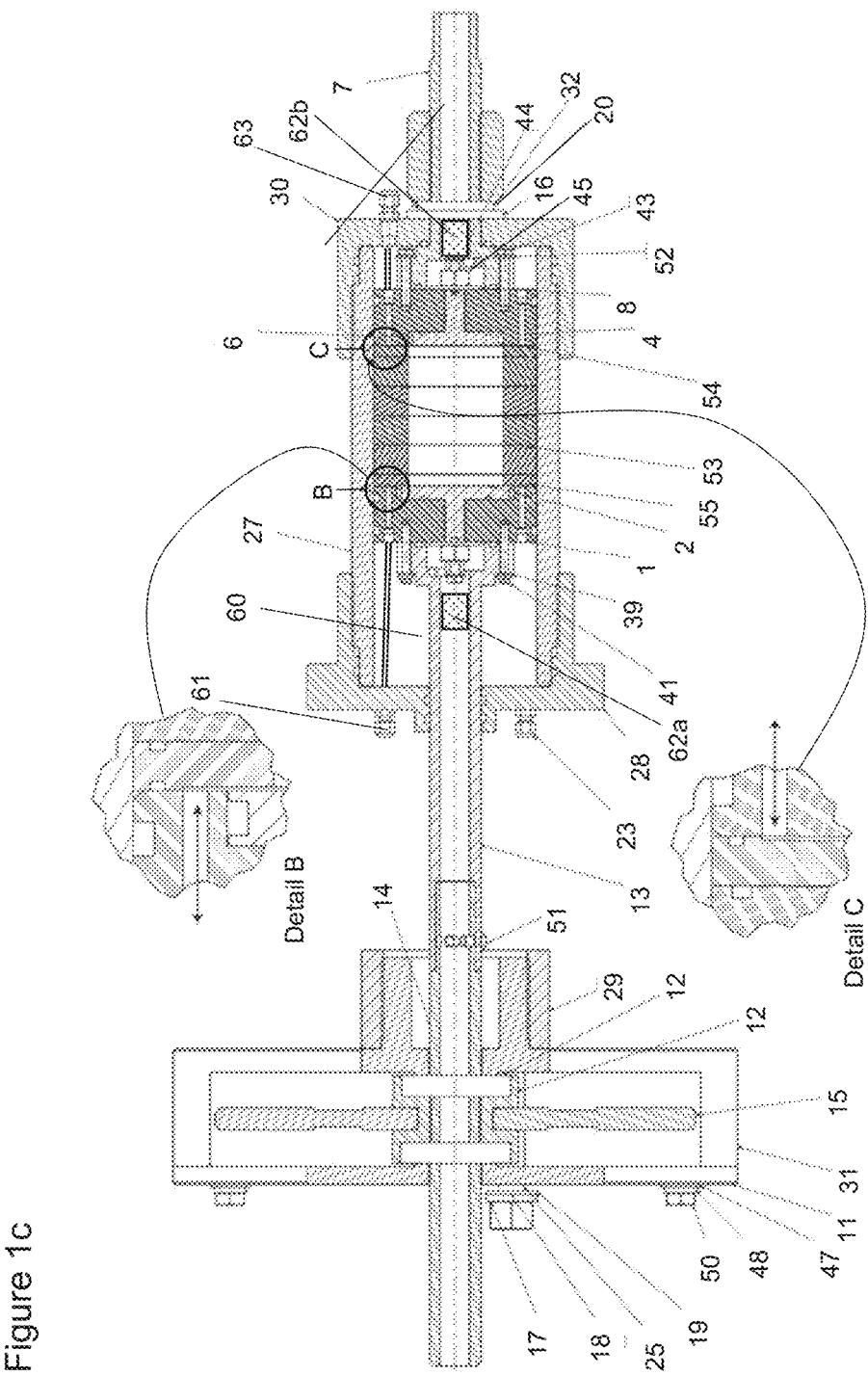

FIG. 1c is a cross-sectional view of the parallel plate impedance cell apparatus of FIGS. 1a and 1b.

In this embodiment the sample chamber is formed by the PEEK ring inserts 53, 54,55, the PEEK electrode pistons 1, 4, and the electrodes 2, 6. This chamber forms a cylindrical space for holding the sample.

The parallel plate impedance cell itself comprises of the main housing (formed by top plate 30, central section 27 and bottom plate 28), the static electrode housing/piston 4 (also called peripheral plug/piston), the dynamic electrode housing/piston 1, the low 6 and high 2 potential electrodes, and two piston pushers 13, 7 for the high and low potential electrode pistons. The housing encases and provides structural support to the sample chamber.

In this case, a threaded shaft 14 is connected to the high or low potential electrode housing (in this embodiment, they are interchangeable) and a wheel. The wheel is made of the wheel ring 12 with internal thread to engage with the threaded shaft 14, the multiple (four) wheel handles 15, that are mounted into the threaded openings/holes in the circumference of the wheel ring 15. This wheel ring sits on the two ball bearings 24 between the top frame 11 and, so called, the bow section of the bottom frame 31. The bow section of the bottom frame 31 is mounted via a threaded connection to the bow section threaded pipe 29, which is attached to the top plate of the cell 28 via bolted connections 46. It will be appreciated that other drive mechanisms may be used to change the relative spacing of the electrodes and apply a pressure to the sample (e.g., hydraulic or pneumatic actuators).

Both piston pushers 13, 7 are connected to the electrode housings/pistons 1,4 using bolted connections 41. In this case, the threaded shaft 14 is connected to the high potential electrode pusher 13 via bolted connections 51. The low potential electrode pusher 7 has a threaded surface on the outside to allow fixation of the low potential electrode piston in the chamber by the bottom nut 32. The low potential electrode piston pusher 7 has a hexagonal shaped end to allow rotation of the low potential electrode piston 4, so that the alignment between the ¼" NPT openings in the bottom plate 30 and the circular through holes of the electrode housings 1, 4 is possible.

Similarly, the end of the high potential electrode piston pusher 13 has four notches to allow the placement of the bolts 51 and the alignment between the ¼" NPT openings in the top plate 28. The sample holder also comprises through holes, in this case in the electrode housings/pistons 1, 4. These through holes at either end of the sample holder allow for the fluids to be introduced into the cell and be produced/evacuated from the cell at the other end. Temperature, pressure, and other sensors may also be inserted through these though holes from both ends.

The low 6 and high 2 potential electrodes are positioned within the pistons 1, 4, and span the inner surfaces of the ring inserts (cylindrical portions) 53, 54, 55 which are surfaces of zero electric potential, so called "ground". These zero-potential surfaces are every path of the parallel plate impedance cell, except of the high 2 and low 6 potential electrodes.

In this case, structural support for the sample chamber is provided by the main housing. The components of the sample chamber (rings inserts 53, 54, 55, and electrode pistons 1, 4) are configured to seal together (e.g., when axially compressed) to prevent any current leakage from the sample under test. In this embodiment, some of these components are not directly connected together, but are sealed using O-rings under pressure.

Changing the number or axial length of the ring inserts allows the sample chamber to vary the inter-electrode spacing of the chamber. The end ring insert 54 (which has 0-ring grooves on each side) can be placed on its own to test 1 cm thick samples. If tests of thicker samples are desired, the PEEK rings inserts 53 (1 cm thick with only one O-ring groove on its side) and 55 (these are 2.5 cm thick inserts with only one O-ring groove on its side) and any combination of them may be added/stacked to the PEEK rings insert 54. That is, the side walls of the sample chamber can be built up with a series of one or more cylindrical pieces of various sizes with O-rings between successive pieces. This configuration of O-rings and pieces ensure that axial pressure seals the sample chamber to retain fluid within the sample chamber, even under pressure.

It will be appreciated that these PEEK ring inserts may be replaced by any other non-conductive, chemical-, stress- and temperature-resistant material and may be made of various thicknesses for testing various samples of various thicknesses if desired.

In this embodiment the end ring inserts 54 and 55 have a channel on a side to allow for a better distribution of injected fluid through the circular openings in the electrode pistons 1, 4. This may allow fluid communication with the inside the sample chamber (see expanded details A and B in FIG. 1c). The fluid may communicate with an external valve (e.g. inlet or outlet 61) or with overburden chamber 60

Both high 2 and low 6 potential electrodes have O-ring grooves that prevent any fluid present in the sample from escaping the sample chamber. The sample chamber is referred to as space enclosed by any number of the PEEK ring inserts 53, 54, 55, and the electrodes 2, 6 and electrode pistons 1, 4.

The electrode pistons 1, 4 in this case are made of non-conducting material (e.g., PEEK) to prevent any distortion of the electric field from the high potential electrode 2 to the low potential electrode 6 surfaces that are in contact with the sample under test.

Metallic components of the main housing and body which encases and controls the sample chamber are nitrided to prevent thread galling. Nitriding is a heat treatment that diffuses nitrogen into the surface of a metal to create a case-hardened surface. This may give it a black colour.

In this embodiment, one electrode piston is static 4, while the other piston is dynamic 1. The dynamic piston can be driven to adjust the inter-electrode spacing and/or to apply an axial pressure to the sample. In this case, the dynamic piston is driven manually by the means of the wheel, that sits on its bearings between the top 11 and bottom 31 frames). This wheel has internal thread engaged with the threaded shaft 14, that converts a rotating momentum into an axial force, that pushes the piston pusher 13 attached to this threaded shaft and the attached to it dynamic electrode piston 1 with its electrode 2 in or out of the central section 27. The maximum sample thickness that can be currently tested is 20 cm, however this may be modified by making the central cylinder section 27, the piston pusher 13 and the threaded shaft longer.

The electrode piston pushers 7, 13 are hollow inside to provide pathways/channels for the coaxial cables from the impedance analyzer and/or EM generator to be connected to the electrodes. This connection between the electrodes and cables should remain static/immobile during the entirety of all tests. Even small relative movements of the coaxial cables in relation to the electrodes may result in inconsistent/non-reproducible impedance measurements. To address this, these connections were fortified with the Viton packers 62 *a,b* made from Viton ¹⁄₁₆" sheets rolled around each pair of coaxial cables and inserted into the electrode piston pushers 7, 13. By pressing and securing the electrode piston pushers onto their corresponding electrode pistons causes both Viton packer to expand, which in turn, firmly secures the coaxial cable pairs after the packers and renders them immobile. These packers may also be made of other more robust elastic polymers, such as Aflas®, Kalrez® or other fluoroelastomers for more demanding applications, where the temperature requirements higher than 204° C., which is the melting point of Viton, need to be met. The material of the O-rings, the ring inserts, the coaxial cables, and the packers may be tailored to achieve temperature ratings as high as 350-400° C.

The coaxial cables RG400 of high temperature rating (up to 200° C.) have been used in our current assembly.

Regarding the materials for the various components of the apparatus:

The first peripheral plug/piston 1 in this case is formed from PEEK 1000.

First or high-potential electrode 2 in this embodiment is formed from 316 stainless steel.

The second peripheral plug/piston 4 in this embodiment is formed from PEEK 1000.

Second or low potential electrode 6 in this embodiment is formed from 316 stainless steel.

LP Pusher feed 7 in this embodiment is formed from 316 stainless steel.

Washer 8 in this embodiment is a AS 1237-14 mm flat metal washer.

Ring 10 in this embodiment is #14 Terminal Ring 12—10 AWG.

top frame 11 in this embodiment is formed from 6061 Aluminium.

Wheel ring 12 in this embodiment is formed from 316 stainless steel.

HP Pusher feed 13 in this embodiment is formed from 316 stainless steel.

Threaded shaft 14 in this embodiment is formed from 316 stainless steel.

Wheel handle 15 in this embodiment is formed from 316 stainless steel.

Washer 16 in this embodiment is a AS 1237-42 mm Flat metal washer.

Nut 17 in this embodiment is a ANSI B18.2.4.6M-M22×2.5 Heavy Hex Nut.

Washer 18 in this embodiment is a AS 1085.7-22 Spring washer.

Washer 19 in this embodiment is a AS 1237-22 mm Flat metal washer.

Washer 20 in this embodiment is a BS 4464-M48 Form A Spring washer.

Tube fitting 23 in this embodiment is a Parker A-Lok Male Taper Thread—Fractional Tube ¼×¼ NPT tube fitting.

Bearings 24 are DIN 625 T1-6012-60×95×18 Deep Groove Ball Bearings.

Stud 25 in this embodiment is a NF E25-135-M22×150 (2×d) Double End Stud.

Central Section 27 in this embodiment is formed from 316 stainless steel.

Top plate 28 in this embodiment is formed from 316 stainless steel.

Bow section pipe 29 in this embodiment is formed from 6061 Aluminium.

Bottom plate 30 in this embodiment is formed from 316 stainless steel.

Bow section bottom frame 31 in this embodiment is formed from 6061 Aluminium.

Nut bottom 32 in this embodiment is formed from 316 stainless steel.

Washer 39 in this embodiment is a ISO 7089-6 Plain washer.

Bolts 41 in this embodiment is a ISO 4162-M6×45 Hexagon flange bolts.

Bolts 43 in this embodiment is a AS 2465-5/16×1¾ UNC Unified hexagon bolts, screws and nuts (UNC and UNF threads).

Screw 44 in this embodiment is a ANSI B18.6.3-5/16-18 UNC×1.125, PHWHMSI Hexagon Head Screw.

Bolts 45 in this embodiment are AS 2465-⅝ UNC Unified hexagon bolts, screws and nuts (UNC and UNF threads).

Bolts 46 in this embodiment are AS 2465-⅝×2½ UNC Unified hexagon bolts, screws and nuts (UNC and UNF threads).

Washers 47 in this embodiment are ANSI B18.22.1-⅝-narrow-Type A Plain Washers (Inch)Type A and B.

Washers 48 in this embodiment are ASME B18.21.1-⅝, HHSLW Heavy Helical Spring Lock Washers (Inch Series).

Bolts 50 in this embodiment are AS 2465-⅝×2 UNC Unified hexagon bolts, screws and nuts (UNC and UNF threads).

Bolts 51 in this embodiment are AS 2465-⅜×½ UNF Unified hexagon bolts, screws and nuts (UNC and UNF threads).

Washer 52 in this embodiment are ASTM F436-5/16, CCW Washers type A

Sleeves or ring inserts 53, 54 and 55 are formed in this embodiment by PEEK 1000

Using the Apparatus

One aspect of the present invention is to determine the impedance of a sample under a range of conditions in order to determine a heating protocol for that sample (e.g., in order to mobilise hydrocarbon deposits from within a formation).

The range of conditions can include a range of temperatures and pressures. For example, in a downhole formation, as the formation is heated or materials extracted (possibly changing the pressure), the impedance profile of the formation may change. This means that the effectiveness of a particular heating protocol may change as the formation is heated and/or fluids are injected or extracted. Data from the present technology may allow the heating protocol to be adapted as the conditions of the reservoir change.

A range of conditions may include different fluids that are injected into or removed from the sample. For example, in a downhole formation, solvent may be injected to help mobilise the hydrocarbon deposits and oil may be removed. This additional solvent may affect how best to heat the formation. The present invention may be used to determine how changing the fluids within a solid matrix (e.g., formed by rock and granular solids) change the impedance spectrum of the sample. Data from the present technology may allow the heating protocol to be adapted as the fluids within the reservoir change. Fluids injected may also include an EM heating fluid which comprises of materials that are effective at converting EM energy into heat energy which can be distributed to the formation. EM heating fluids may comprise metal nanoparticles (e.g., transition metal nanoparticles) and their oxides. A nanoparticle may have a largest dimension of between 1 to 100 nanometres.

To facilitate fluid exchange with the sample, fluid is allowed to enter and exit the sample chamber through the through-holes in both electrode pistons 1, 4 as shown in FIG. 1c. Each of these holes may be equipped with, for example, fittings to allow fluids in or out of the sample chamber. There are multiple modes of experiments possible in this impedance cell apparatus, including the batch and the flow-through. The extra overburden can be supplied by introducing fluids into the overburden chamber 60 behind the dynamic electrode piston 1.

The sample's fluids are allowed to be produced or injected through openings 61, 63 in top 28 and bottom 30 caps. Tube unions are used to separate injected and produced fluids from the non-conductive overburden fluid in the overburden chamber 60 behind the dynamic electrode piston 1 between the main housing and the sample chamber.

The overburden pressure in the overburden chamber 60 can be controlled by a pump through the duration of each experiment to ensure consistent contact pressure on the electrodes onto the sample. Consistent pressure is important in achieving consistent impedance measurements, while the EM or conductive heating is being performed on the sample.

Pressure can be applied to the sample within the sample chamber by moving the dynamic electrode piston 1 towards the static electrode piston 4. This compresses the sample and the ring inserts 53, 54, 55 and O-rings forming the side walls of the sample chamber. By compressing the walls, the seals are improved as the pressure of the sample is increased. It will be appreciated that moving the dynamic electrode piston 1 away from the static electrode piston 4 may be used to lower the pressure within the sample chamber.

The O-ring grooves are present between the top cap 28 and electrode piston pusher 13 to allow the concentric movement of the electrode piston pusher 13 and prevent leakage of the overburden fluid behind the dynamic electrode piston 1. There are O-ring grooves on the inside surface of both top 28 and bottom 30 caps to prevent leakage of any fluid inside of the housing. Each electrode pusher 13, 7 has an O-ring groove on their faces, where they get bolted to the electrode pistons 1, 4, to prevent leakage of any fluids inside of the cell. There is another O-ring groove on the inside of the flat surface of the bottom cap (30) that is in contact with the electrode piston pusher 7. Each electrode piston has two O-ring grooves on its cylindrical surface to allow for a concentric movement of each electrode piston inside of the central pipe section 27.

The double end stud 25 is inserted through both grooves in the top 11 and bottom 31 wheel frames to secure the wheel position, when needed.

The coaxial cable pairs for both high and low potential electrodes get connected to the electrodes the following way. First, the coaxial cables get stripped and the central wires get exposed and twisted in pairs. Next, the central wires in both pairs are inserted through the holes drilled through the connective bolts 44. These two pairs of cables are then connected to the high and low potential electrodes by screwing the bolts with these two pairs of wires inserted in them into the threaded holes in the electrodes 2, 6.

Both cable pairs are fed through the piston pushers 13, 7 and the Viton packers are wrapped around the coaxial cables in place of the connection with the electrodes. The central lines of the coaxial cables are attached to electrodes 2 and 6. Finally, the Viton packers get inserted/pushed into the hollow cylindrical space of the piston pushers 13, 7 and are secured in place by bolts screwed through the pushers 13, 7 to the electrode pistons 1, 4. These Viton packers being placed right around the coaxial cable pair to the electrode connections ensure that these connections do not move during the experiment, disassembly and assembly of the apparatus.

In order to prevent migration of fine particles of the material under test, screens (one or more non-conductive screens) of various mesh size may be applied to cover the holes in the electrode pistons 1, 4. For example, if a liquid solvent is being recycled through the sample during a test, it is important the fine materials are not removed with the solvent.

As has been mentioned above, impedance measurements may be conducted using the parallel plate impedance cell in a batch or a flow-through mode.

For batch tests, the parallel plate impedance cell is connected to the pump through a transfer vessel, so that any desired fluid may be injected from one side of the cell (usually for the side of the static electrode piston 4). The overburden may be applied mechanically using the wheel, and/or hydraulically by injecting a non-conductive or conducting liquid into the overburden chamber.

In these batch experiments the through holes in the dynamic electrode piston 1 may be plugged, and the fluid injection and production are only allowed from the static electrode piston 4 side.

A vacuum pump may be used to evacuate all air and other gases present in the chamber and the sample under test. Once, the overburden is applied and all gases have been evacuated from the sample, the injection step may start either by spontaneous imbibition (i.e., by gravity) or by using the injection pump. The temperature and pressure inside of the cell and the overburden pressure are monitored by a thermocouple and pressure transducers. The sample pressure could be controlled with either a back pressure regulator or a pump, the sample temperature could be controlled by a temperature regulator connected to a thermocouple, that is inserted into the sample's chamber.

The heating may be supplied externally through heat conduction (e.g., using a heating tape or water bath) controlled by the temperature regulator. Heating may also be provided by an electromagnetic power generator connected to the electrodes through the channels in the electrode pushers 13, 7 by using the same coaxial cable pairs used for the impedance measurements.

The supplied current and voltage characteristics may be monitored and logged using an oscilloscope connected to the output terminals of the power generator. The power output of the power generator may be controlled using a logic controller (e.g., PID controller) to reach the desirable sample's temperature.

An increase in temperature typically induces fluid expansion. Therefore, there is a back-pressure regulator (BPR) to keep the sample's pressure at a certain desired level (e.g., corresponding to the oil reservoir pressure).

The system may also include a separator for removing materials from fluids extracted from the sample and/or the amine scrubbing unit (to remove any $H_2S$ present in the produced fluid).

Any produced gases may be collected in the gas sampling cylinders and analyzed (e.g., using gas chromatography (GC)). The produced liquid gets separated from the production feed in the separator and its composition is assessed by using some nuclear magnetic resonance techniques (e.g., Carr-Purcell-Meiboom-Gill sequencing) and the simulated distillation gas chromatography (SimDist GC) technique.

All temperature and pressure sensor data along with the impedance frequency responses get recorded and stored in a database.

For the batch type experiments, in this case, overburden stress is supplied to consolidate the sample under test by pumping non-conductive or conductive fluid into the respective overburden chambers (axially, in case of the parallel plate impedance cell, and radially, in case of a coaxial impedance cell). Mechanical axial overburden onto the sample under test may also be provided by moving the electrodes together while the sample is in place.

The second type of the impedance measurement experiments that may be carried out in the parallel plate impedance cell is of the flow-through type. This means that the production and injection ports are located at both electrode pistons and that the fluid is allowed to pass through the sample under test. This similar to the batch type experiment, except that: the production and injection lines are located on opposite sides of the apparatus, and at least one circular hole is open to flow in both electrode pistons 1, 4. A pressure transducer may be used to monitor the fluid pressure at the outlet.

In this case, an acquisition program has been written in MATLAB App Designer™ to display and record impedance frequency responses and the converted dielectric and conductivity frequency responses to the data base (MySQL™).

This software also allows users to change number of points required in their measurements, changing the frequency range (e.g., within 4 Hz to 5 MHz, which is the Hioki IM3570™ frequency range of impedance measurements) and switching between the automatic and manual modes for the measurement to be conducted. Generally, for impedance determinations relevant for heating, frequencies lower than 1 MHz are the most relevant. The electrode spacing, which is the space between the low 6 and high 2 potential electrodes need also be supplied to correctly recalculate the dielectric constant and conductivity frequency responses.

There has been a second custom program developed in MATLAB App Designer™ to display the real and the imaginary parts of the measured impedance frequency responses along with the extracted dielectric and conductivity frequency responses and the dielectric loss frequency responses.

First, a user needs to select the database, from which the dataset that is being measured or was measured in the past is stored in the MySQL™ data base. The software uploads the selected dataset to the table in the GUI and into the memory of the running application. Once dataset is uploaded to the application, the time interval of the measurement is detected. Second, a user chooses what range of data needs to be displayed in the GUI table by changing the start and stop time stamps/dates. From the table with the selected datasets a user can choose what dataset need to be displayed by ticking (or unticking to remove the data sets from the charts) the "Display status" logic box. Various experiment conditions such as the sample temperature and pressure, overburden pressure, electrode spacing etc. are get associated with each data set inside of this application and get displayed in the legend box and get added to the interactive table of the GUI (see FIGS. 18a-c, FIGS. 19a-c, FIGS. 20a-c).

There has been a third custom program developed in MALTAB App Designer™ to capture kinetics of different physicochemical processes that may take place within the sample under test during the impedance measurement experiment such as e.g., diffusion and dispersions of salts into a saturating fluid of an oil sand sample etc. (see FIGS. 4a-d, FIG. 13, FIGS. 17a-c).

This program builds evolution curves, based upon one of the measured and/or derived parameters of the sample under test, such the real and imaginary impedance, relative dielectric constant and conductivity sampled at any specified frequency within the measurement frequency range (see FIGS. 4a-d, FIG. 13, FIGS. 14a-b).

Figure 15A:
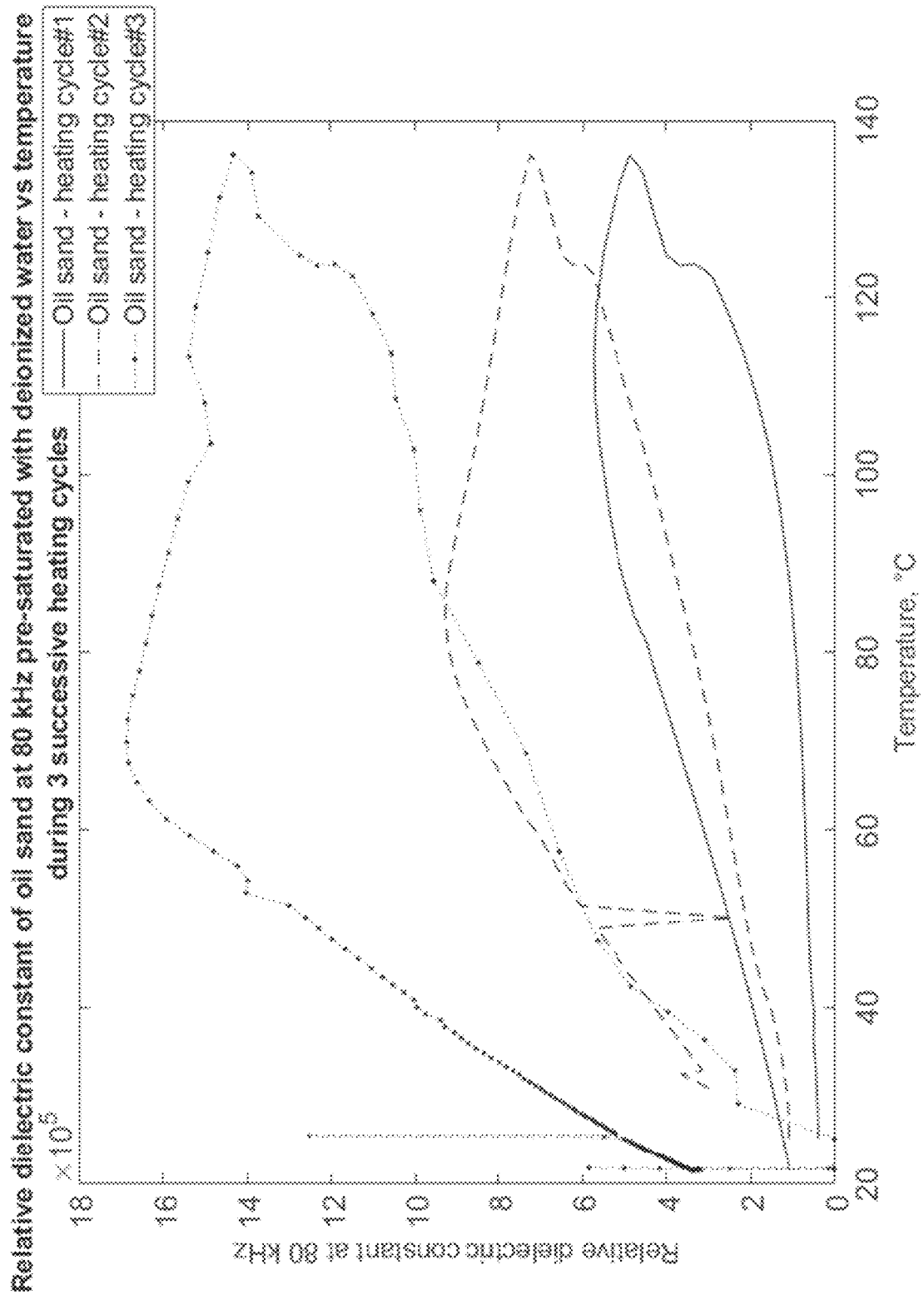
FIG. 15a is a graph of relative dielectric constant of oil sand at 80 kHz pre-saturated with deionized water vs temperature during 3 successive heating cycles—temperature hysteresis relative dielectric constant curves
Figure 15B:
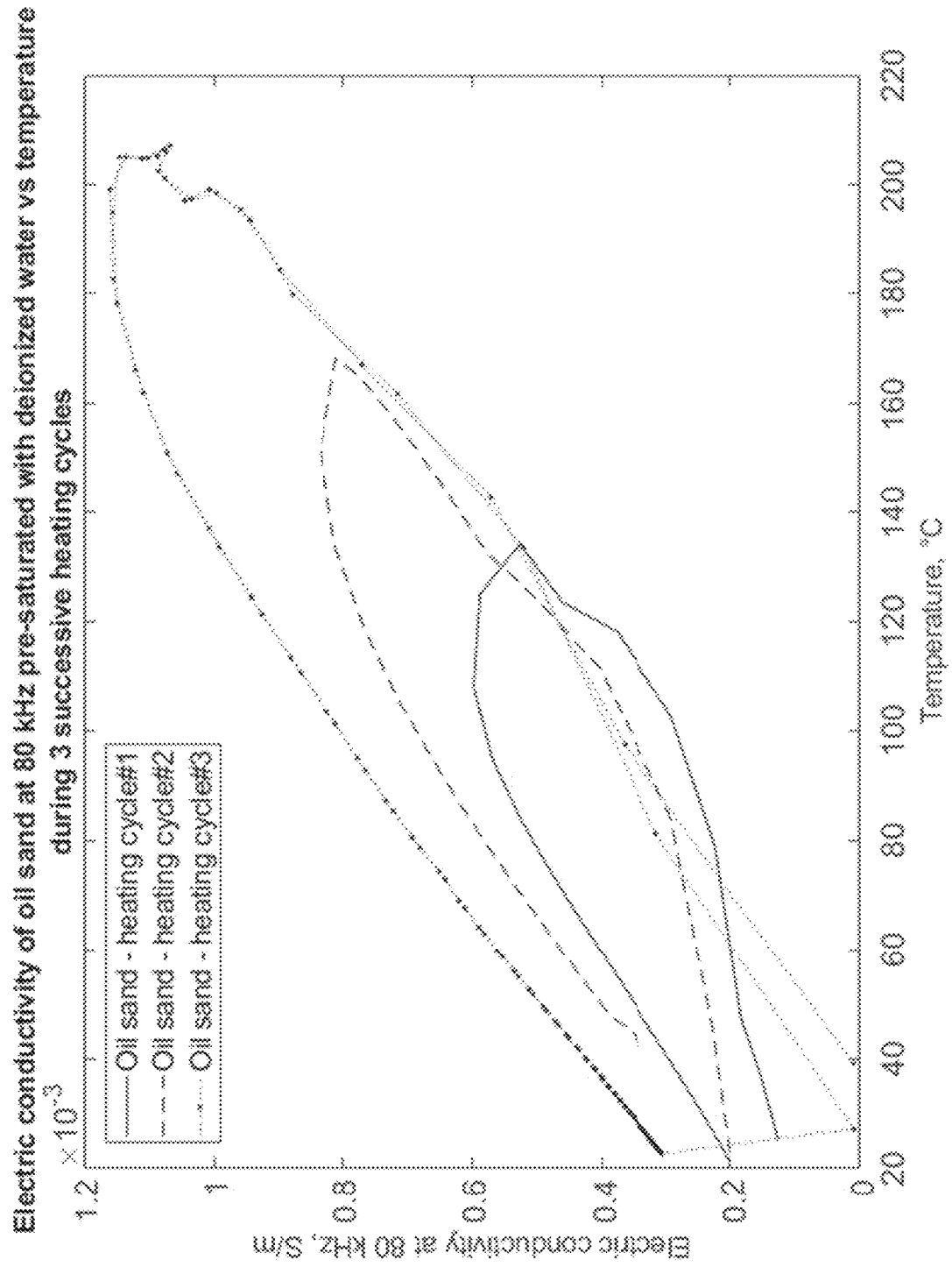
FIG. 15b is a graph of electric conductivity of oil sand at 80 kHz pre-saturated with deionized water vs temperature during 3 successive heating cycles—temperature hysteresis conductivity curves

This program also allows to capture hysteresis that is observed in dielectric properties, when the impedance measurements are taken, while the sample is being heated and cooled-off to its initial temperature in successive heating cycles (see FIGS. 15a-b).

Figure 16A:
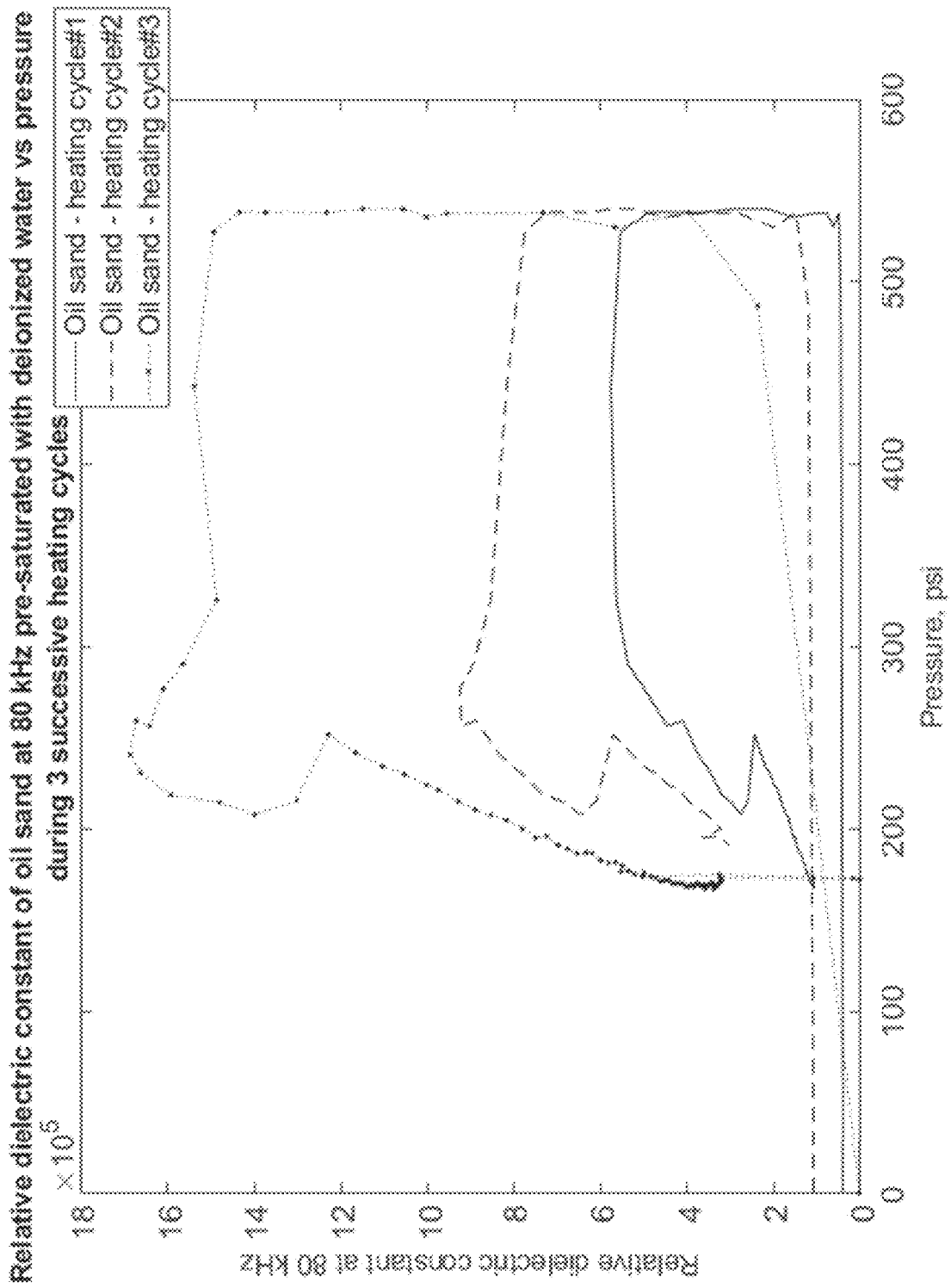
FIG. 16a is a graph of relative dielectric constant of oil sand at 80 kHz pre-saturated with deionized water vs pore pressure during 3 successive heating cycles—pore pressure hysteresis relative dielectric constant curves
Figure 16B:
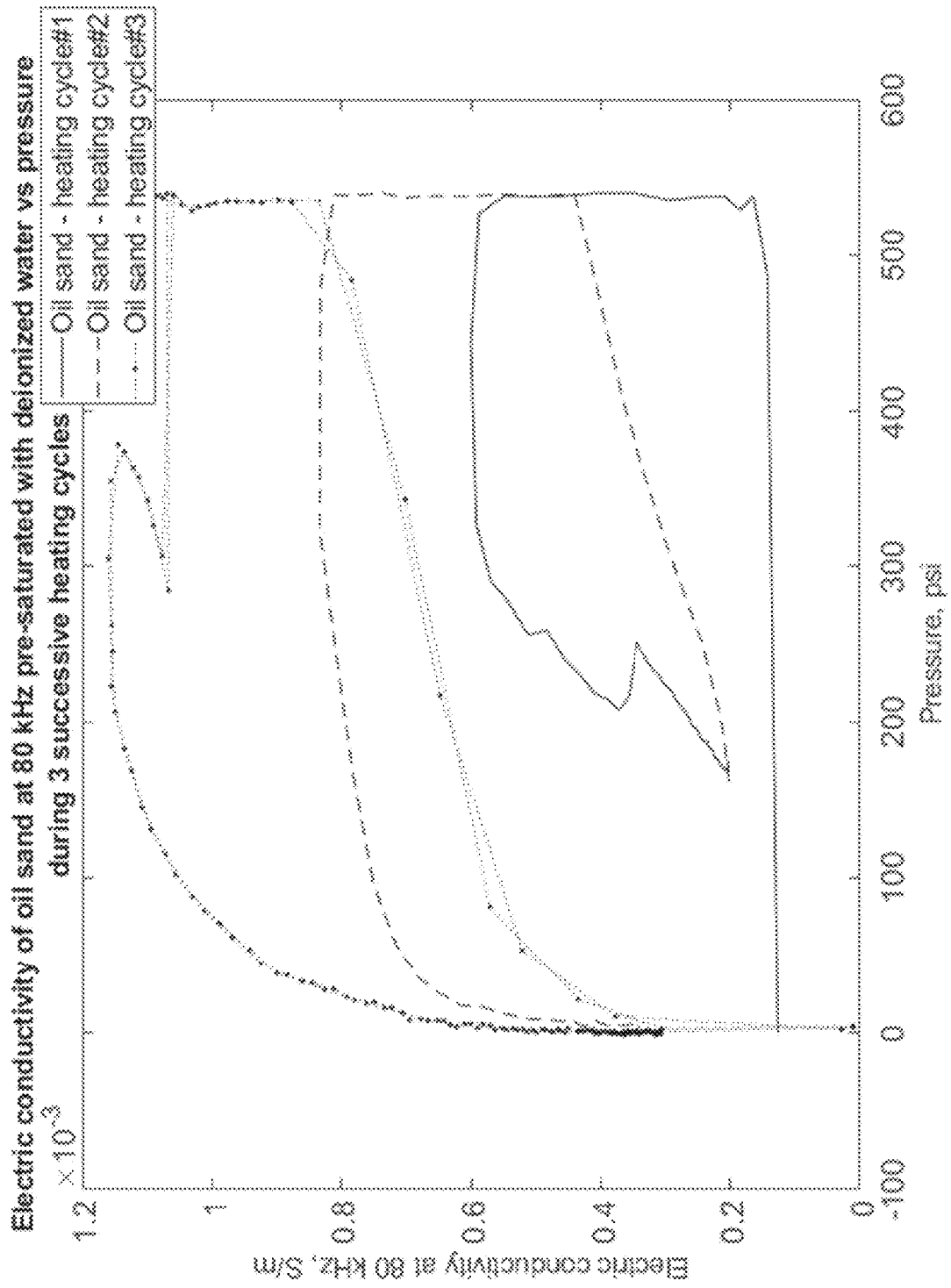
FIG. 16b is a graph of electric conductivity of oil sand at 80 kHz pre-saturated with deionized water vs pore pressure during 3 successive heating cycles—pore pressure hysteresis conductivity curves
Figure 17A:
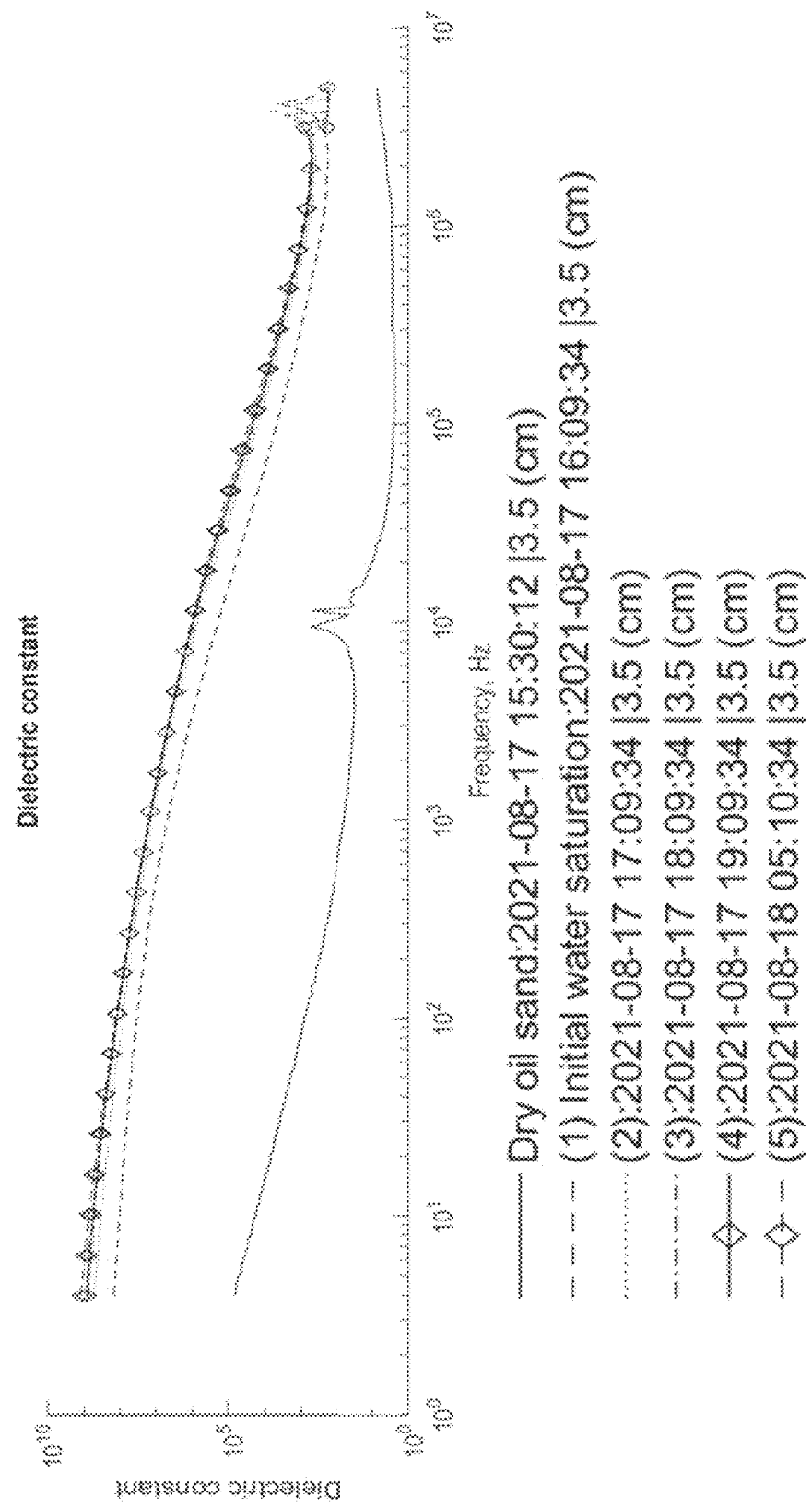
FIG. 17a is a graph of relative dielectric constant frequency responses of the oil sand sample pre-saturated with deionized water measured during the diffusion of salts and minerals present in the oil sand sample
Figure 17B:
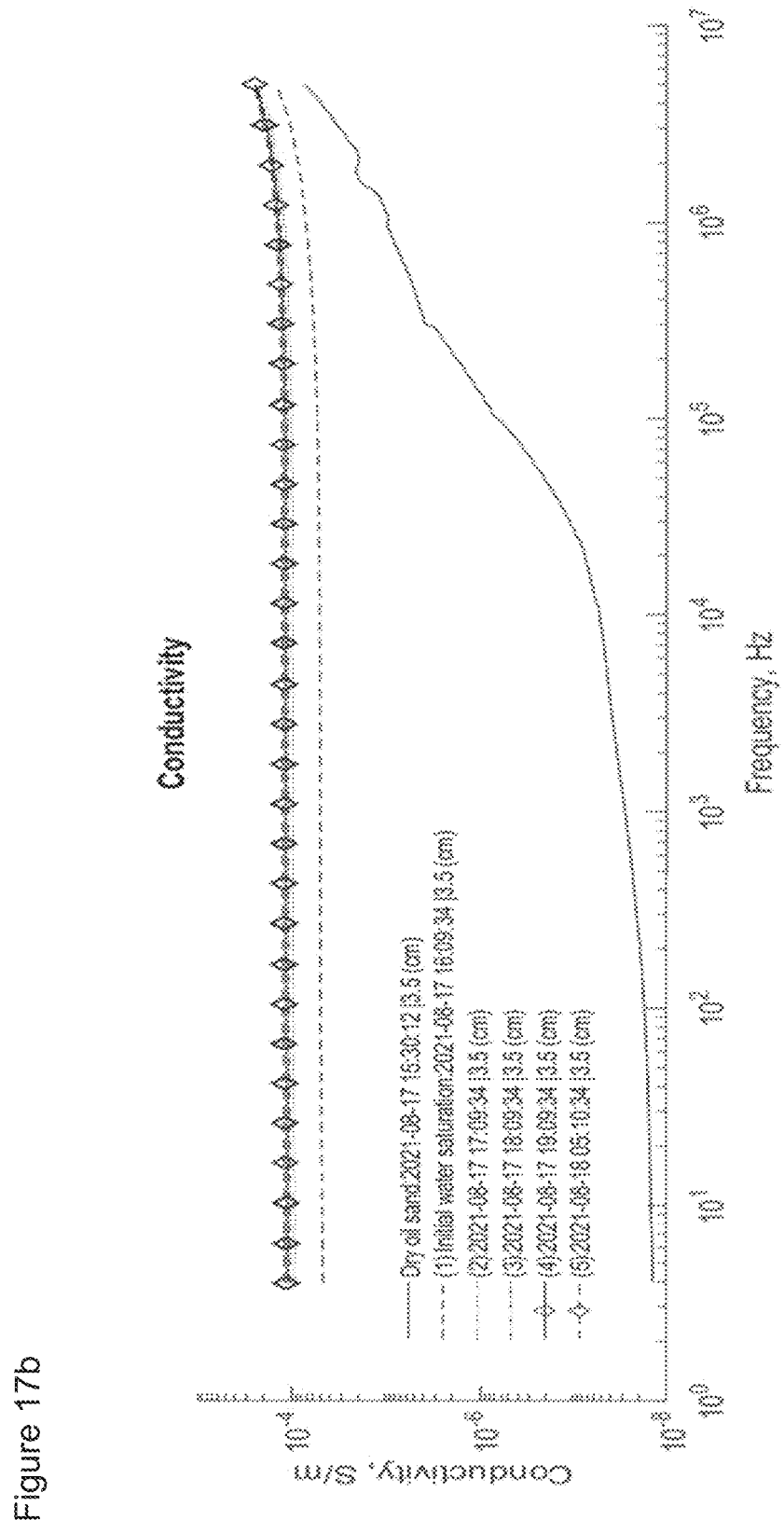
FIG. 17b is a graph of conductivity frequency responses of the oil sand sample pre-saturated with deionized water measured during the diffusion of salts and minerals present in the oil sand sample
Figure 17C:
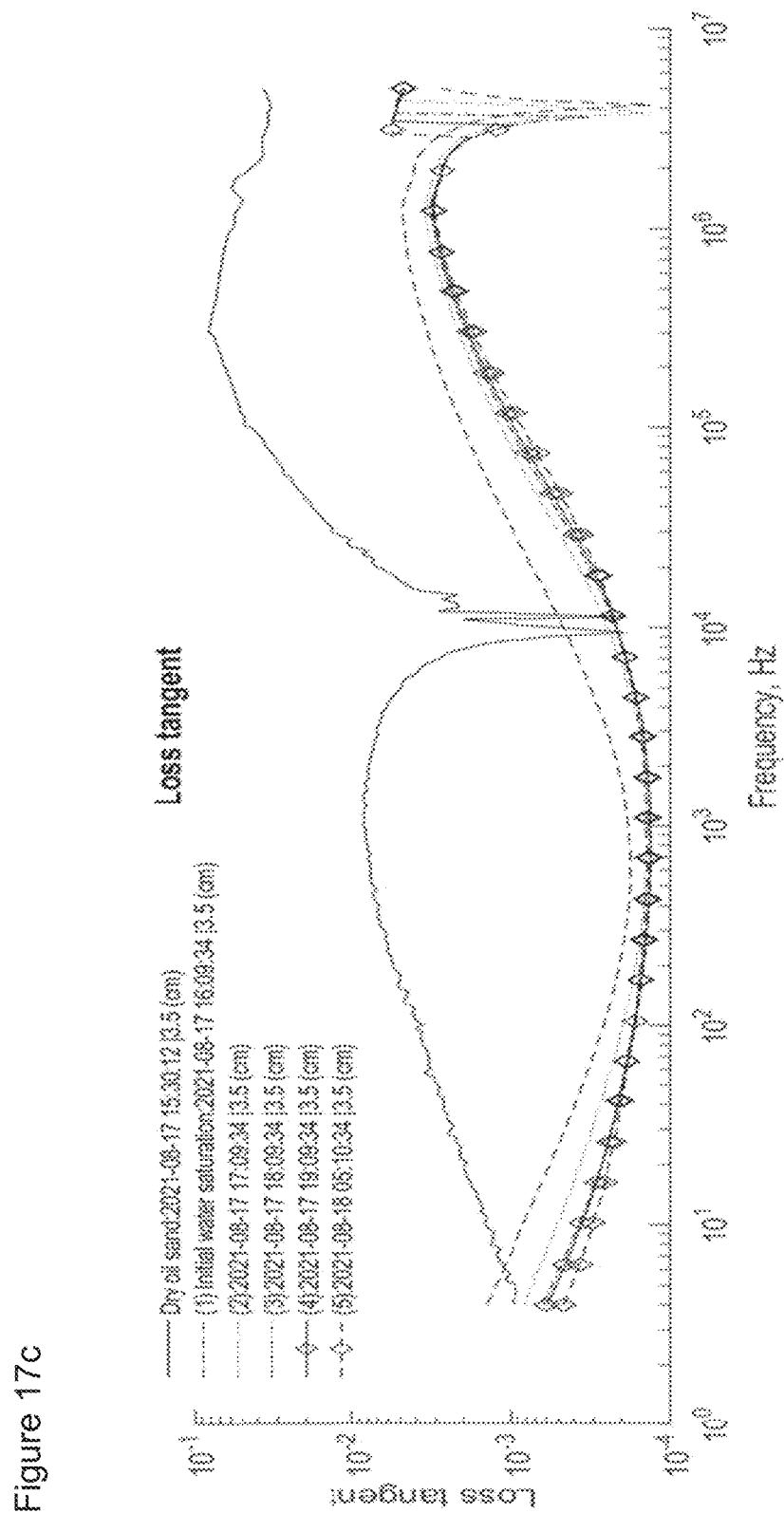
FIG. 17c is a graph of dielectric loss frequency responses of the oil sand sample pre-saturated with deionized water measured during the diffusion of salts and minerals present in the oil sand sample
Figure 18A:
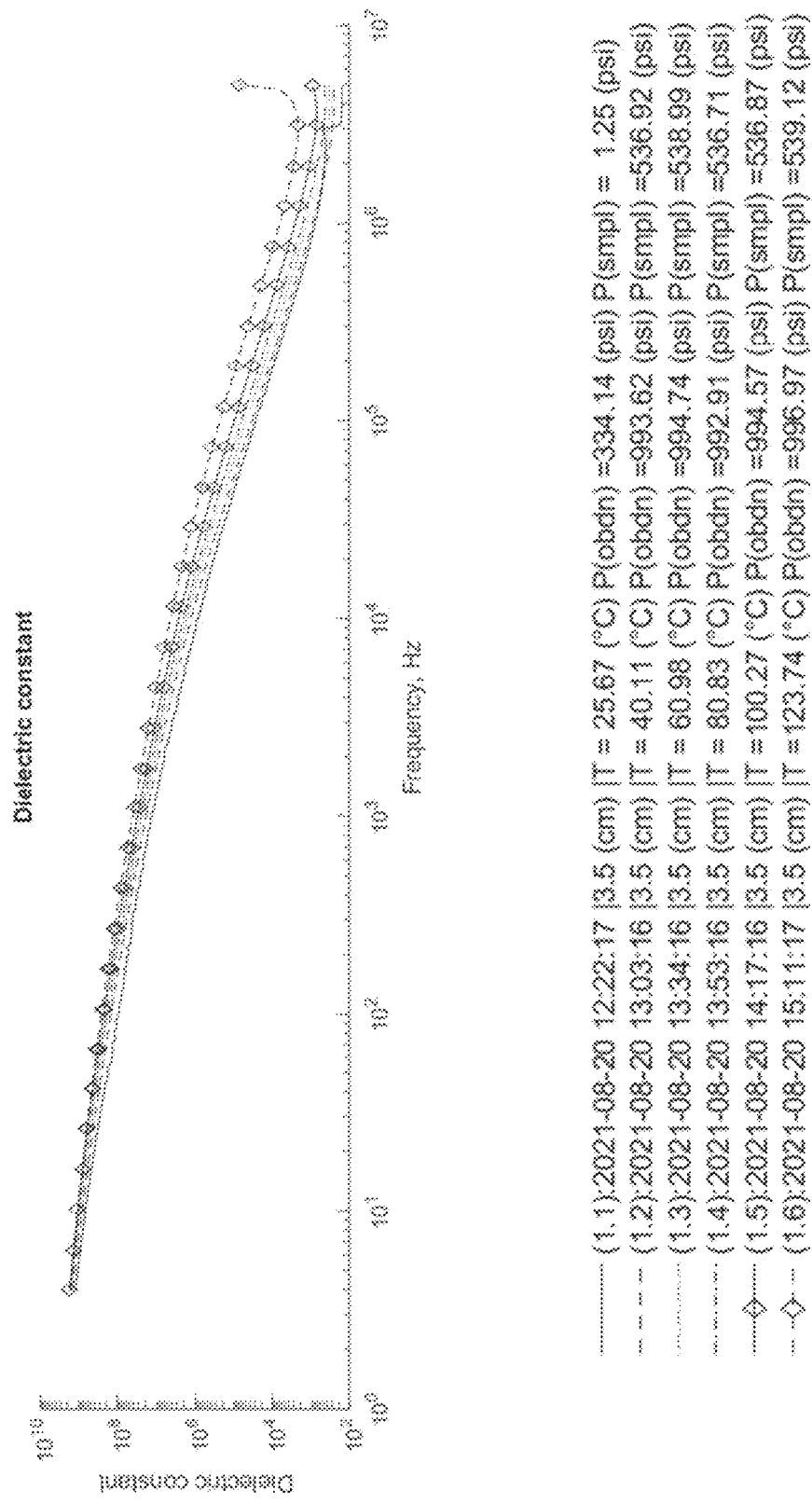
FIG. 18a is a graph of relative dielectric constant frequency responses of the oil sand sample pre-saturated with deionized water measured while heated from 20° C. to 123.74° C., overburden pressure=1000 psi, back pressure=540 psi, electrode spacing=3.5 cm (heating cycle #1)
Figure 18B:
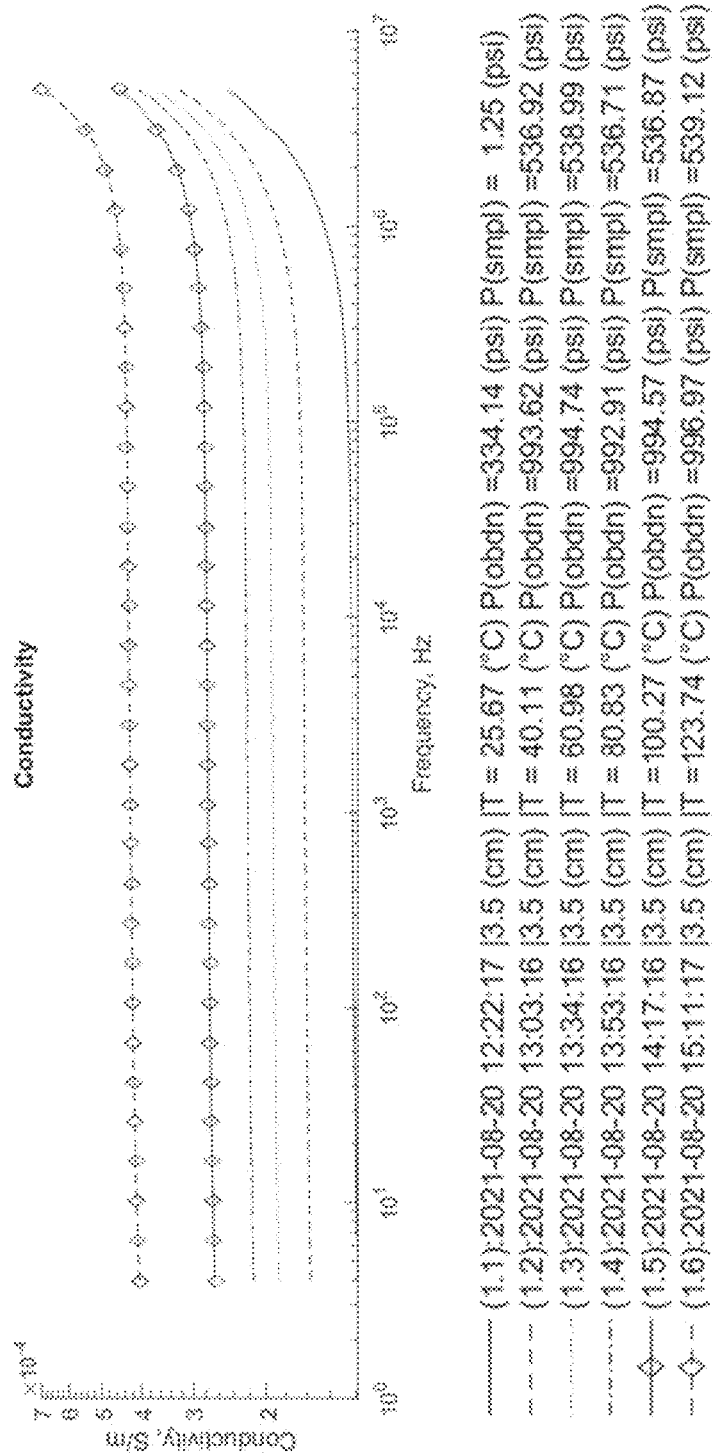
FIG. 18b is a graph of conductivity frequency responses of the oil sand sample pre-saturated with deionized water measured while heated from 20° C. to 123.74° C., overburden pressure=1000 psi, back pressure=540 psi, electrode spacing=3.5 cm (heating cycle #1)
Figure 18C:
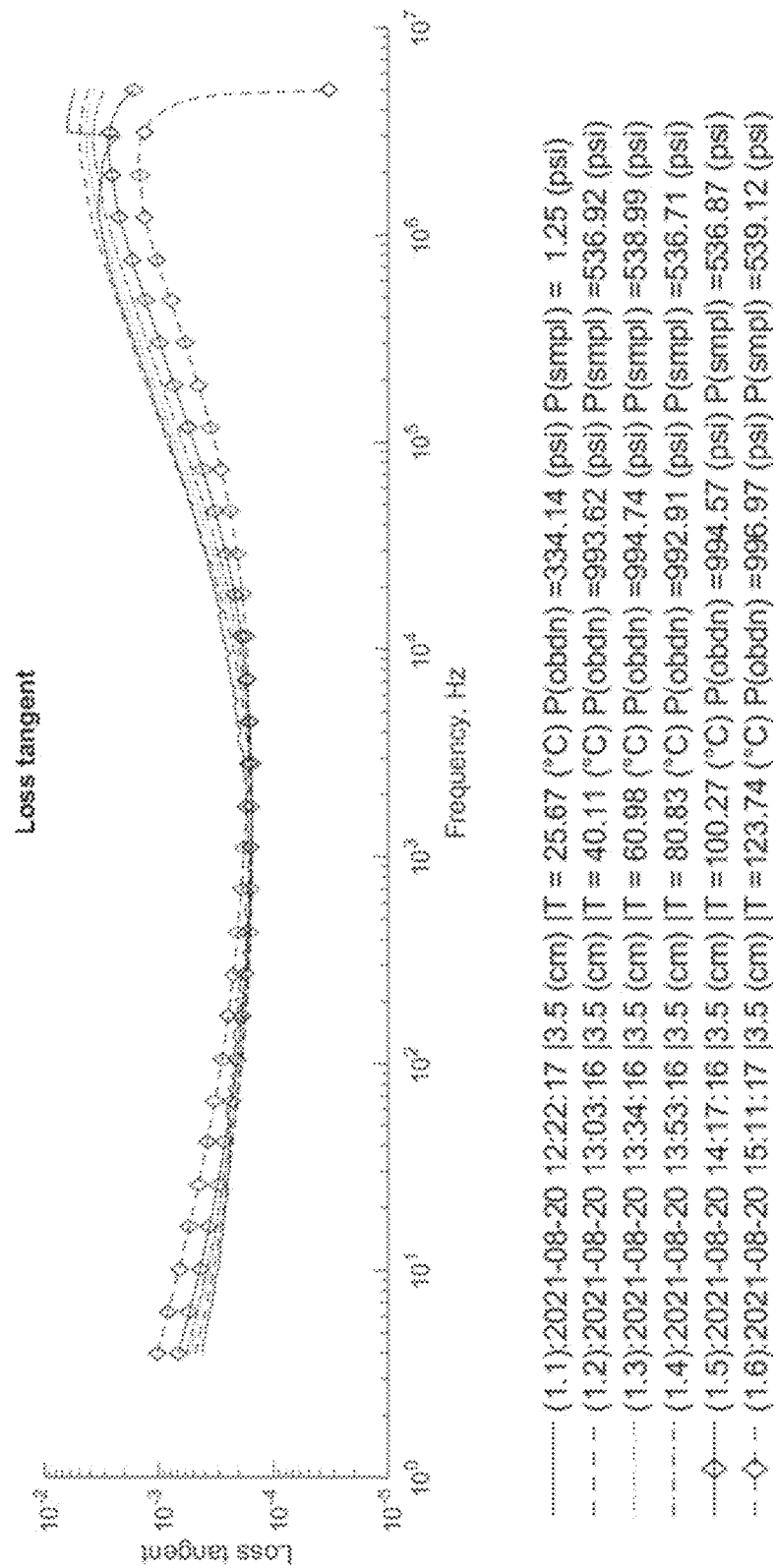
FIG. 18c is a graph of dielectric loss frequency responses of the oil sand sample pre-saturated with deionized water measured while heated from 20° C. to 123.74° C., overburden pressure=1000 psi, back pressure=540 psi, electrode spacing=3.5 cm (heating cycle #1)
Figure 19A:
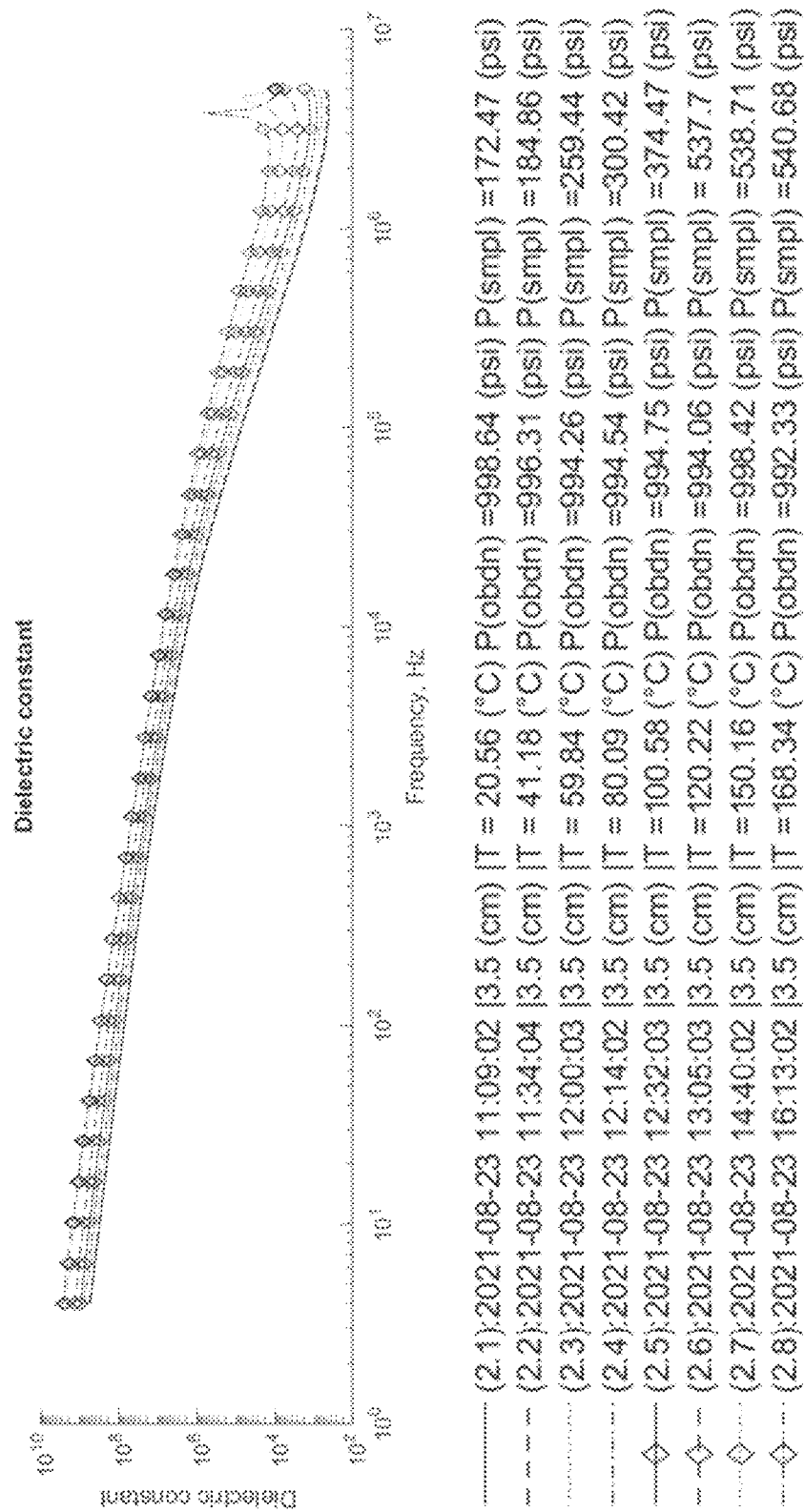
FIG. 19a is a graph of relative dielectric constant frequency responses of the oil sand sample pre-saturated with deionized water measured while heated from 20° C. to 123.74° C., overburden pressure=1000 psi, back pressure=540 psi, electrode spacing=3.5 cm (heating cycle #2)
Figure 19B:
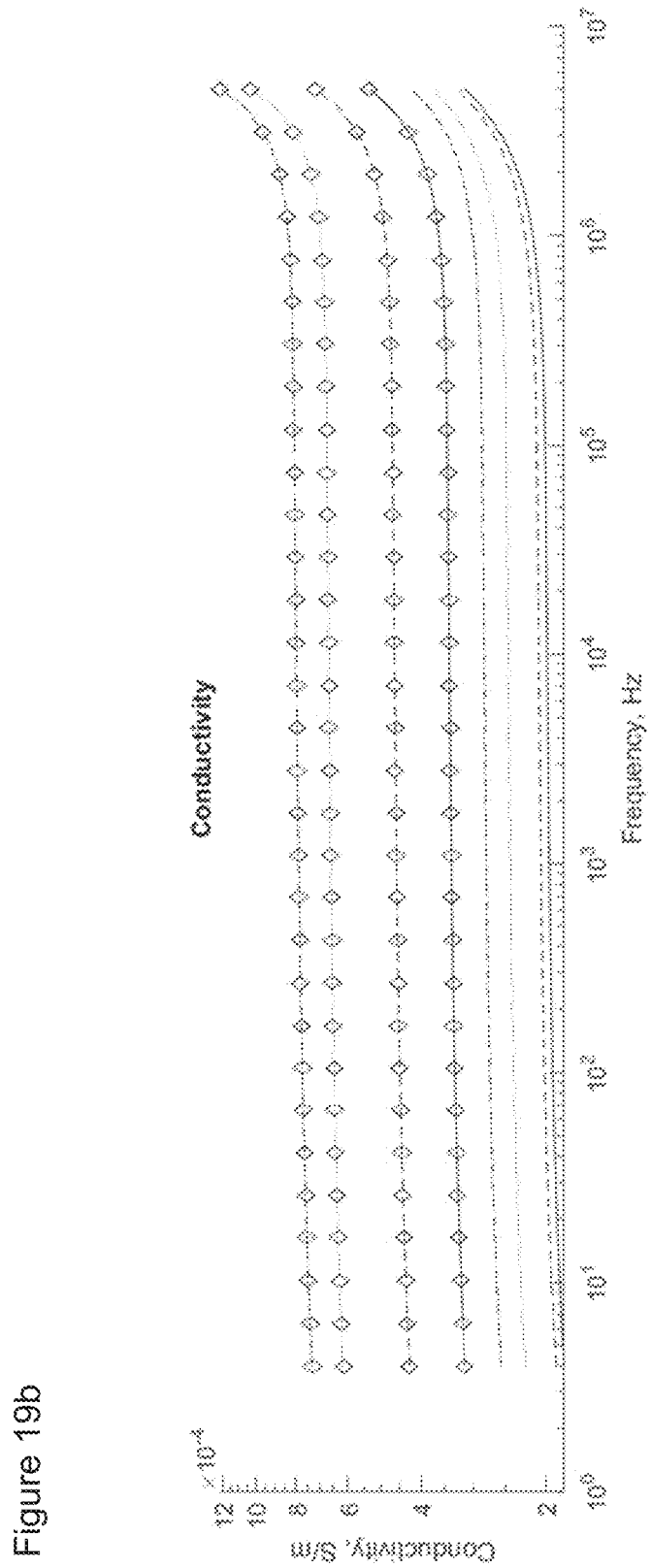
FIG. 19b is a graph of conductivity frequency responses of the oil sand sample pre-saturated with deionized water measured while heated from 20° C. to 168.34° C., overburden pressure=1000 psi, back pressure=540 psi, electrode spacing=3.5 cm (heating cycle #2)
Figure 19C:
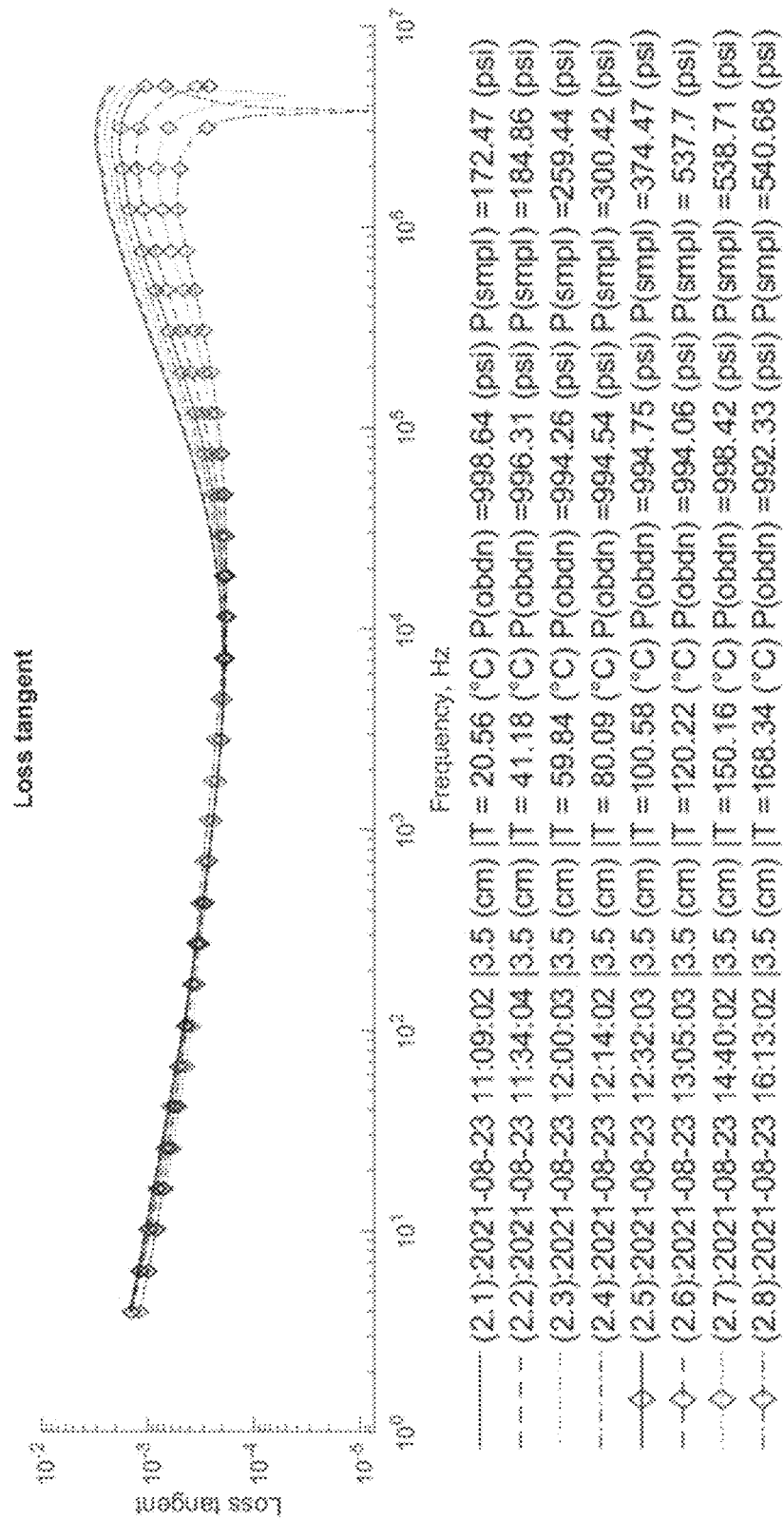
FIG. 19c is a graph of dielectric loss frequency responses of the oil sand sample pre-saturated with deionized water measured while heated from 20° C. to 168.34° C., overburden pressure=1000 psi, back pressure=540 psi, electrode spacing=3.5 cm (heating cycle #3)
Figure 20A:
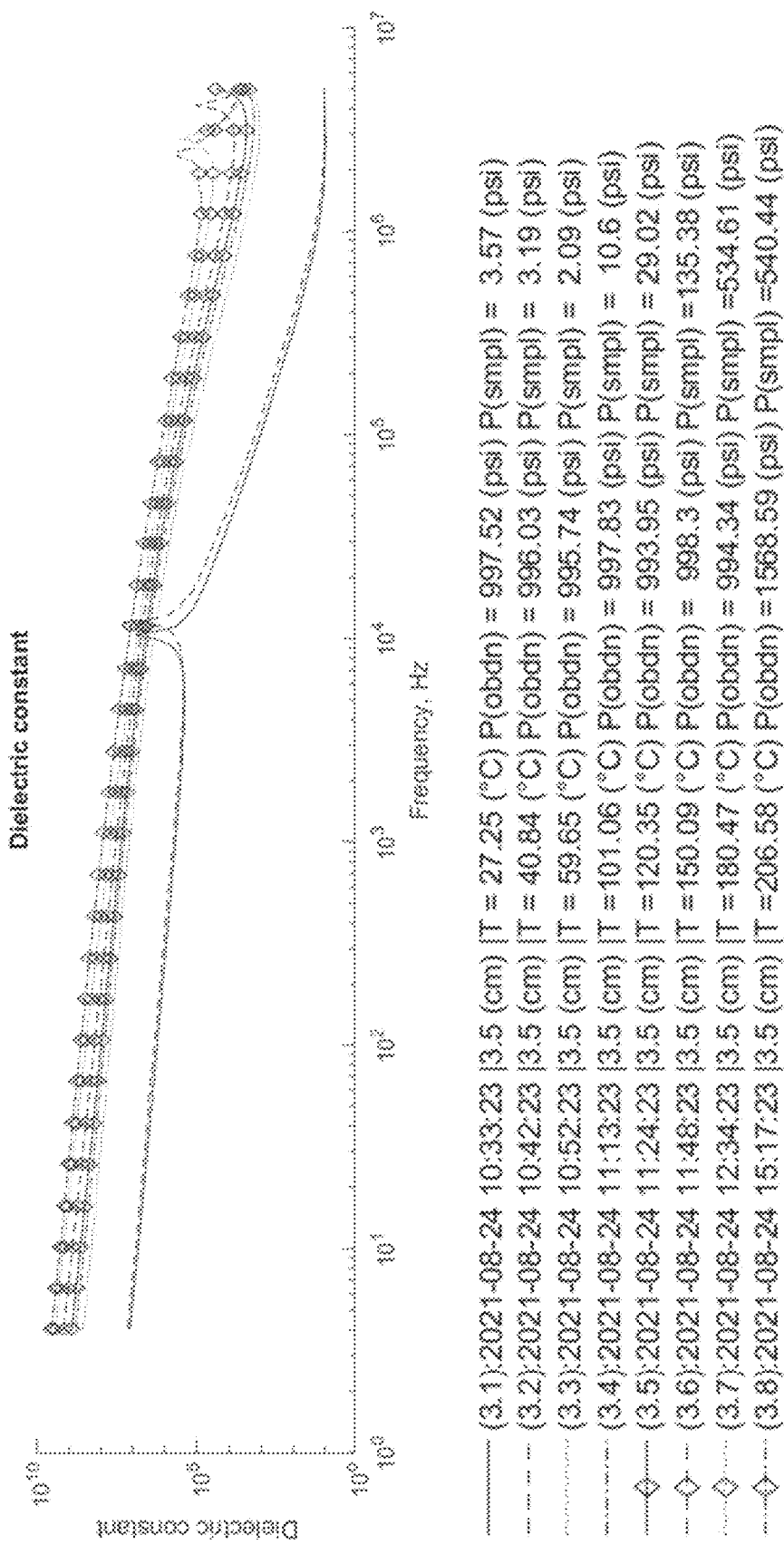
FIG. 20a is a graph of relative dielectric constant frequency responses of the oil sand sample pre-saturated with deionized water measured while heated from 20° C. to 206.58° C., overburden pressure=1000 psi, back pressure=540 psi, electrode spacing=3.5 cm (heating cycle #3)
Figure 20B:
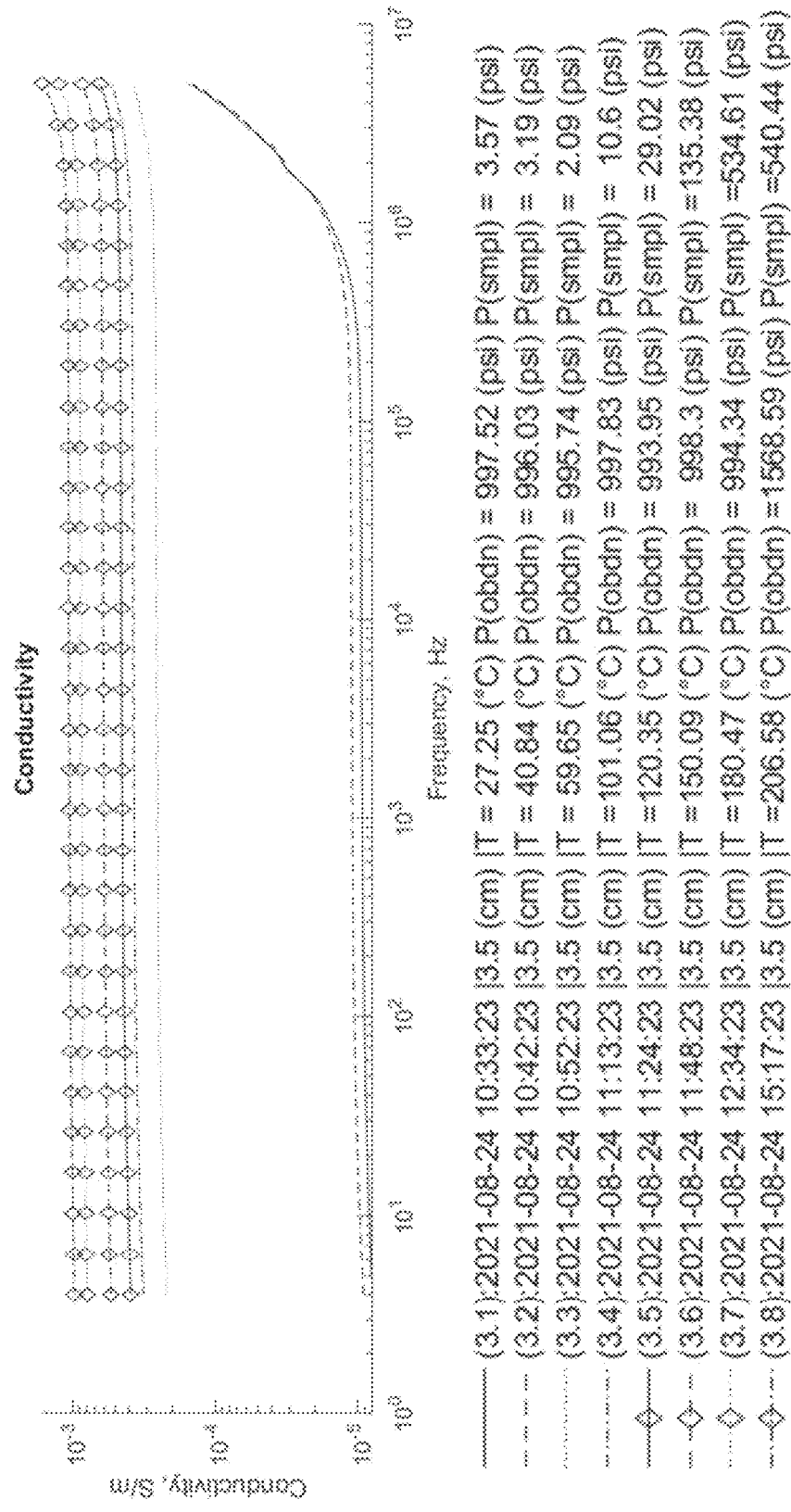
FIG. 20b is a graph of conductivity frequency responses of the oil sand sample pre-saturated with deionized water measured while heated from 20° C. to 206.58° C., overburden pressure=1000 psi, back pressure=540 psi, electrode spacing=3.5 cm (heating cycle #3)
Figure 20C:
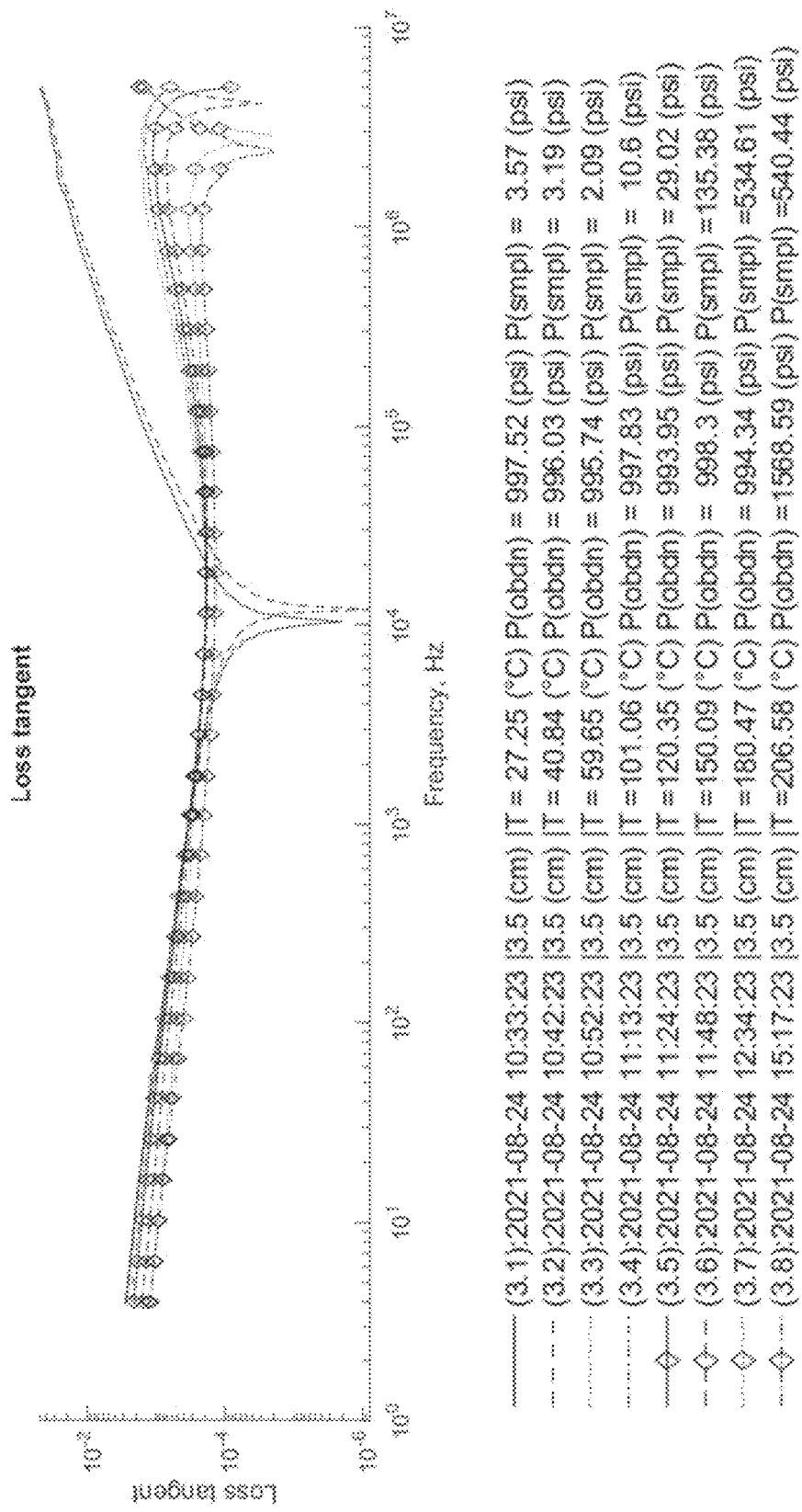
FIG. 20c is a graph of dielectric loss frequency responses of the oil sand sample pre-saturated with deionized water measured while heated from 20° C. to 206.58° C., overburden pressure=1000 psi, back pressure=540 psi, electrode spacing=3.5 cm (heating cycle #3)

Similar to the temperature hysteresis curves, pressure dependency of the measured samples' dielectric data can also be captured using this post-processing application during the successive heating cycles (see FIGS. 16a-b).

Figure 12A:
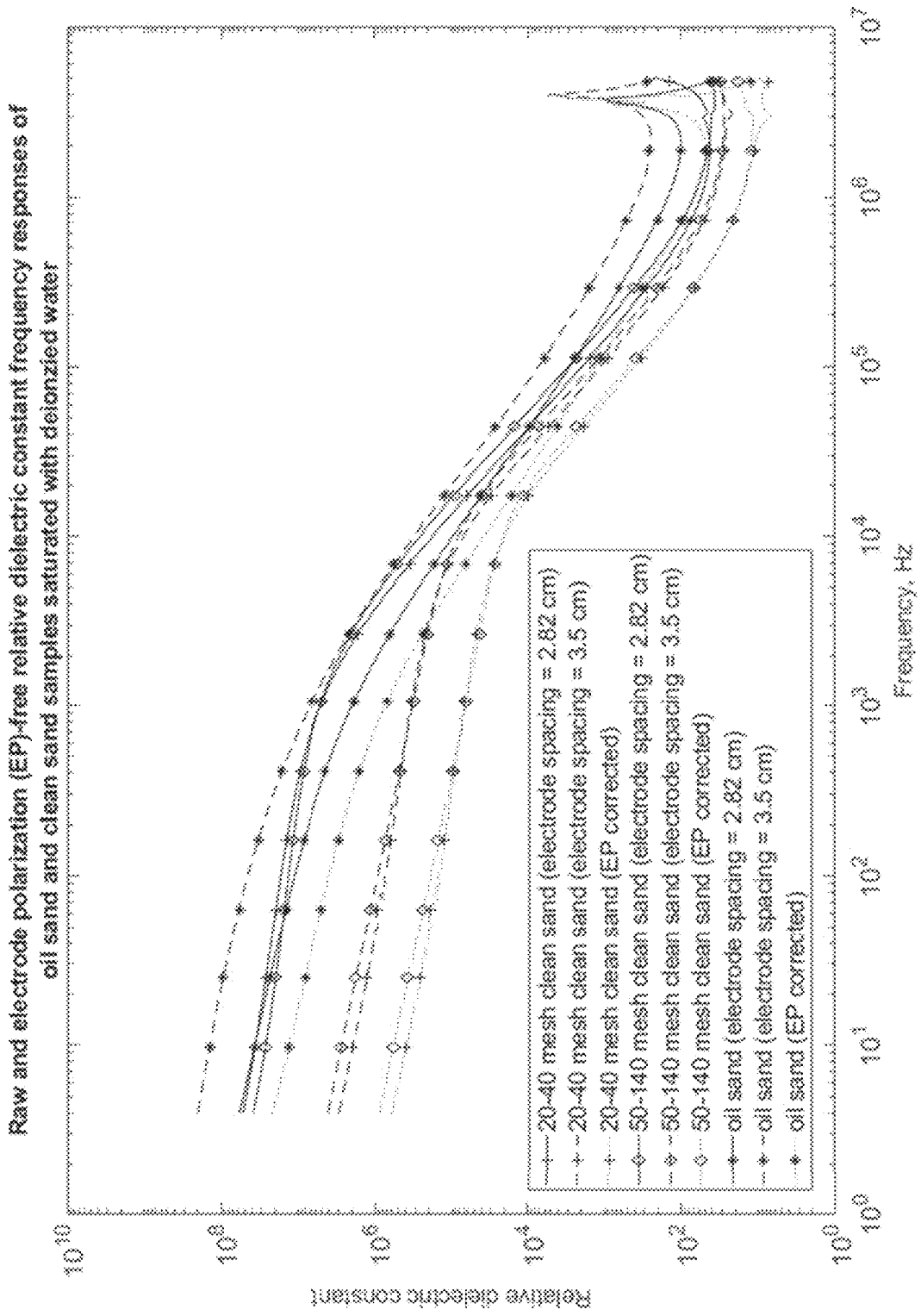
FIG. 12a is a graph of raw and electrode polarization (EP)-free relative dielectric constant frequency responses of oil sand and clean sand samples saturated with deionized water at ambient conditions
Figure 12B:
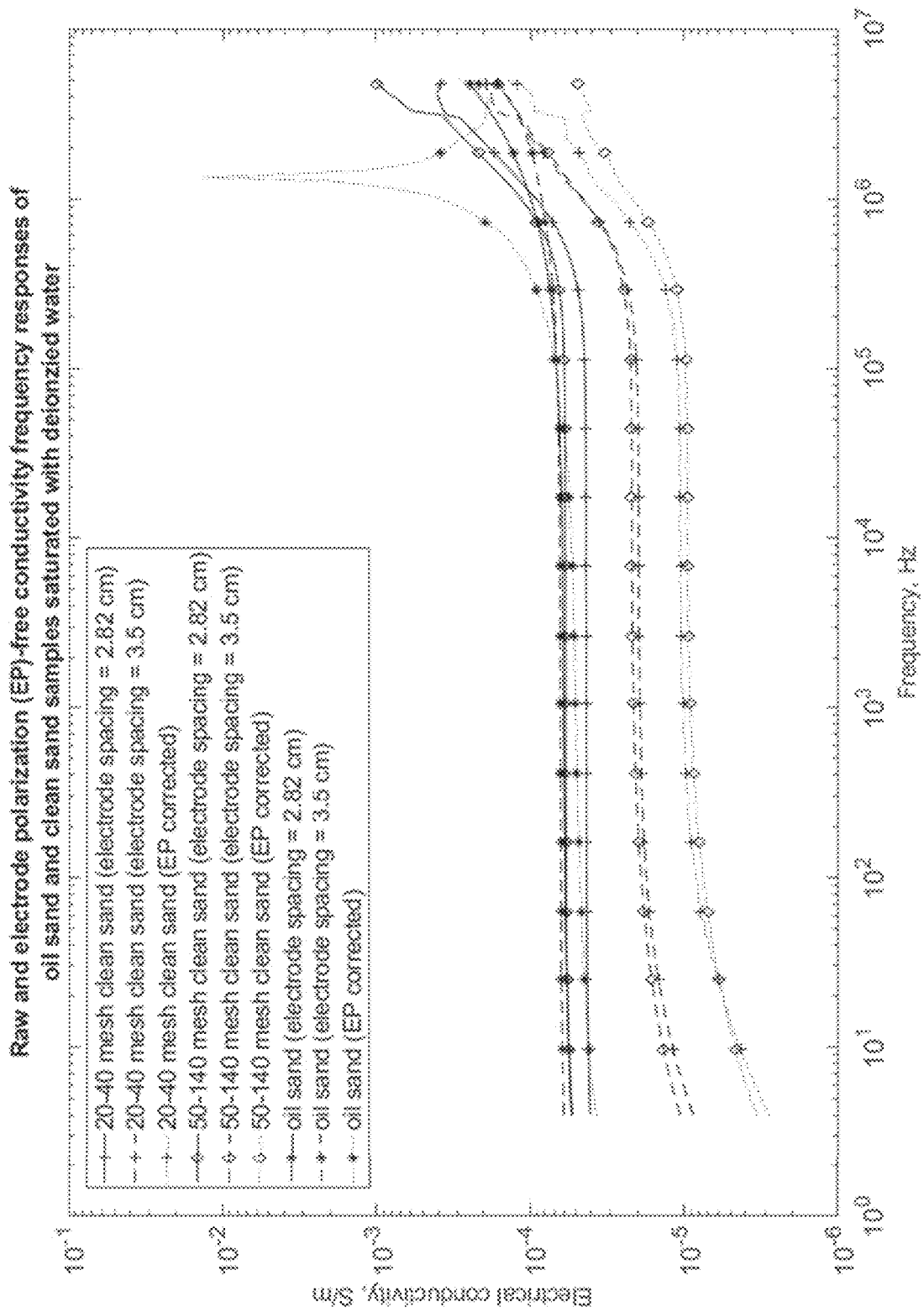
FIG. 12b is a graph of raw and electrode polarization (EP)-free conductivity frequency responses of oil sand and clean sand samples saturated with deionized water at ambient conditions
Figure 13:
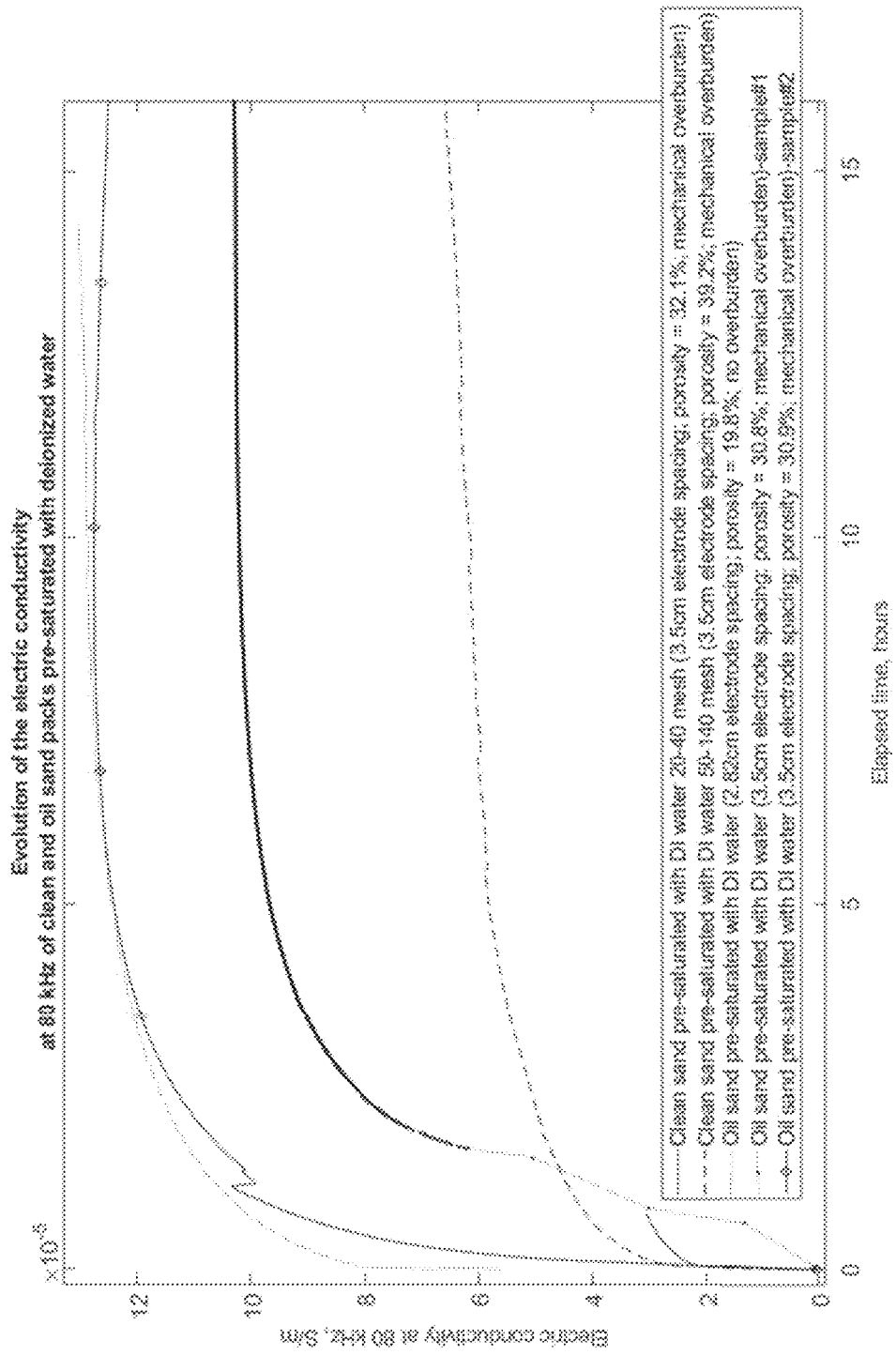
FIG. 13 is a graph of the time evolution of the electric conductivity at 80 kHz of the clean and oil sand samples pre-saturated with deionized water
Figure 14A:
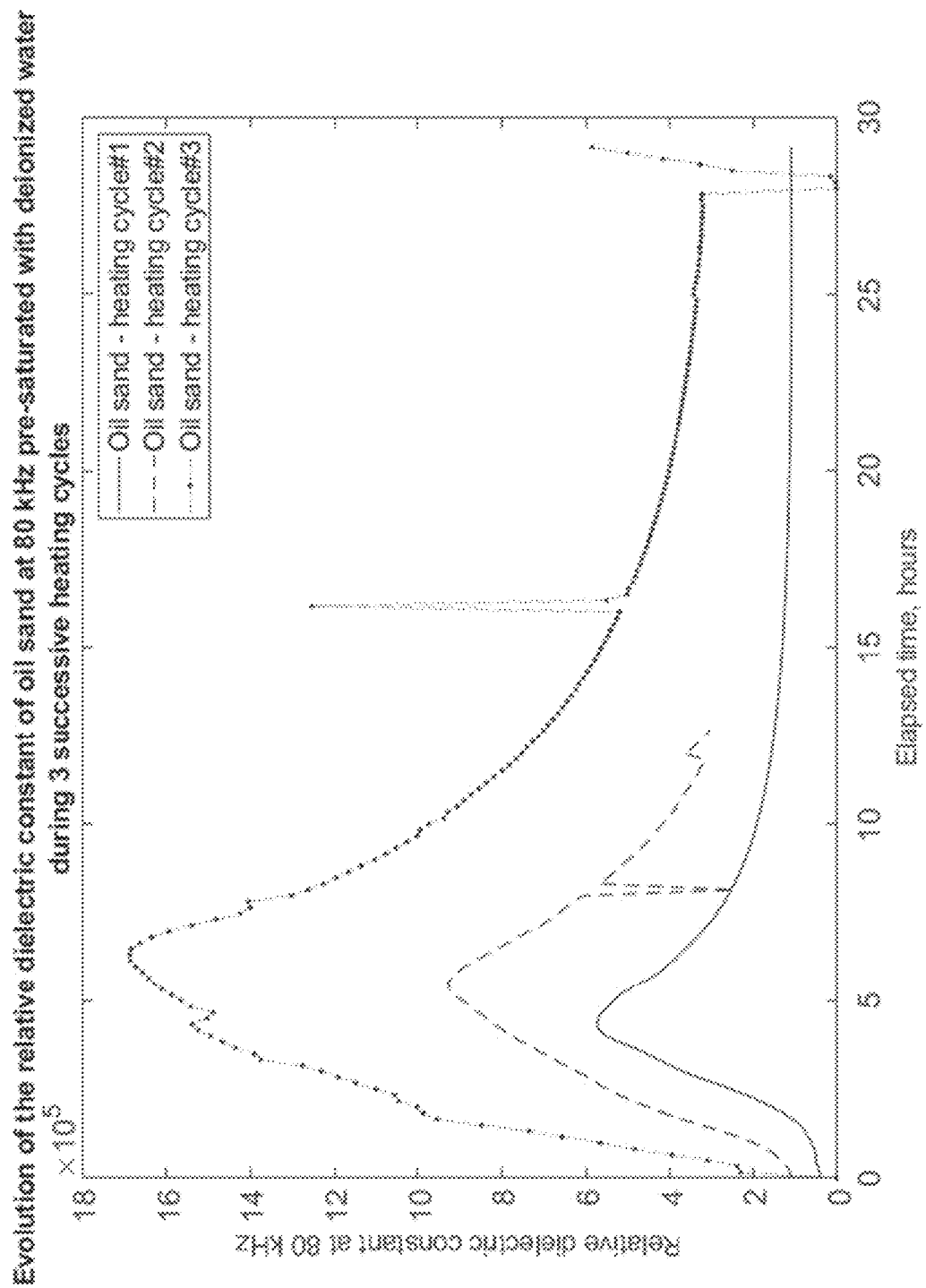
FIG. 14a is a graph of time evolution of the relative dielectric constant of oil sand at 80 kHz pre-saturated with deionized water during 3 successive heating cycles
Figure 14B:
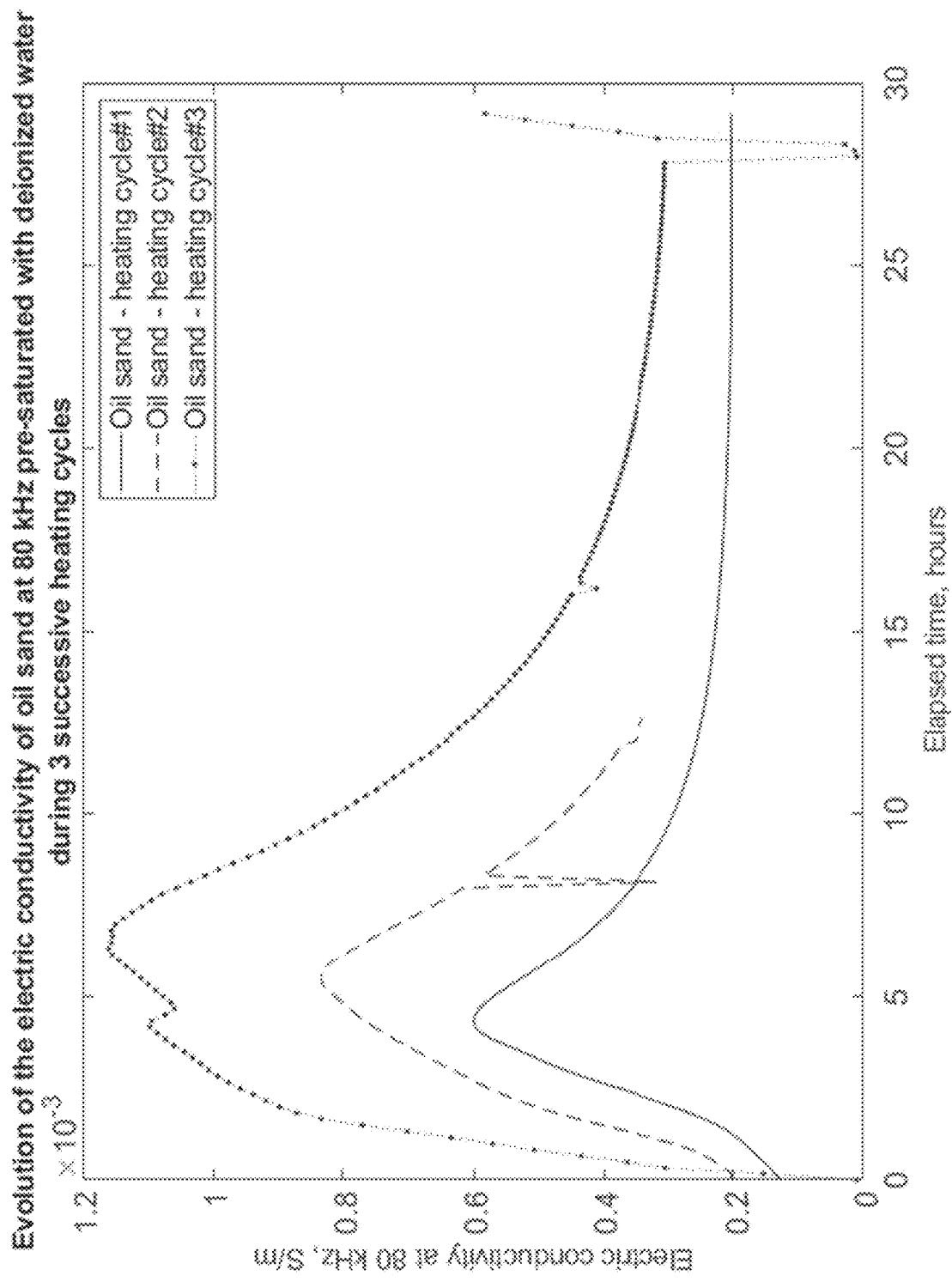
FIG. 14b is a graph of time evolution of the electric conductivity of oil sand at 80 kHz pre-saturated with deionized water during 3 successive heating cycles

Electrode polarization effects could be removed by measuring samples at two distinct electrode spacing intervals (e.g., 2.82 cm and 3.5 cm). That is, the measured response may be considered to be a combination of the bulk properties of the sample, and electrode polarization effects (see Theory section below). By doing two measurements, the electrode polarization effects can be isolated. The original and electrode polarization (EP)-free dielectric frequency responses are shown for the clean sand samples of the 20-40 and 50-140 mesh sizes and for the oil sand sample (see FIGS. 12a-b).

Coaxial Cell Apparatus

Figure 2A:
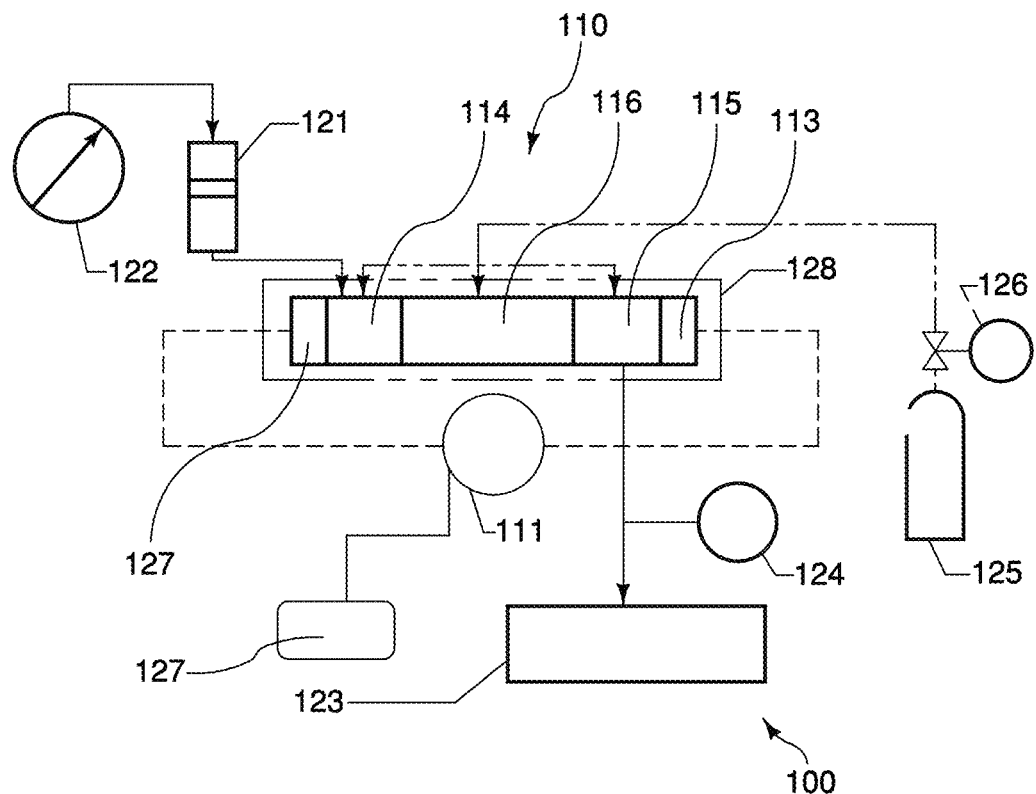
FIG. 2a is a schematic of a further embodiment of the apparatus comprising a coaxial impedance cell.
Figure 2B:
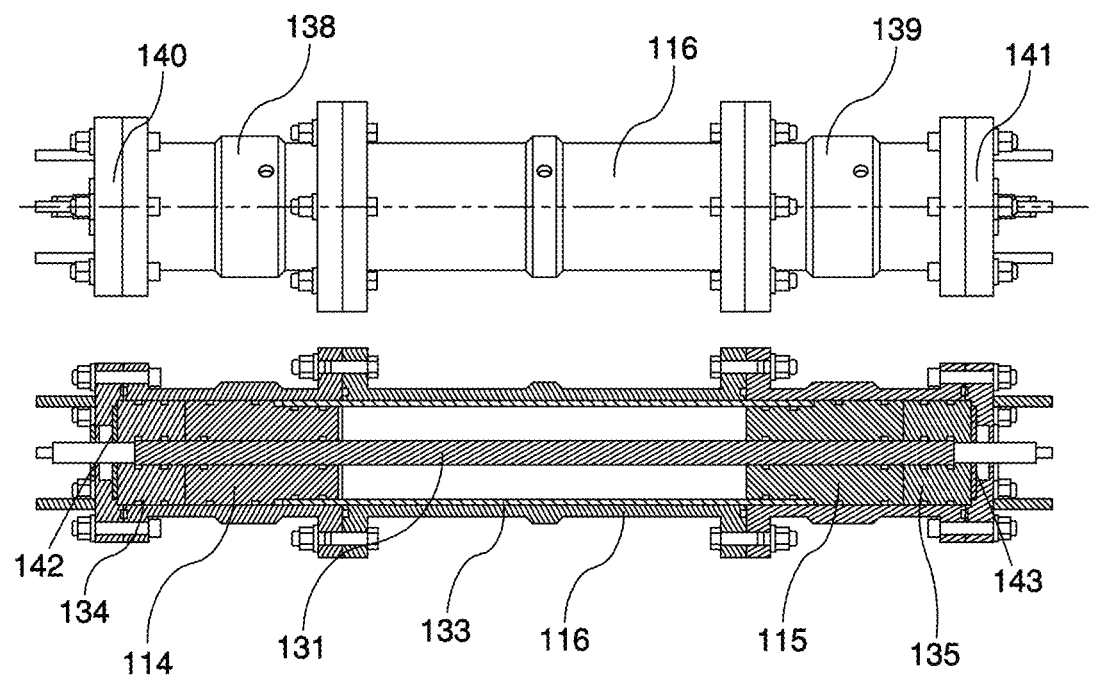

FIGS. 2a-2b show an embodiment of a further apparatus 100 for determining the impedance spectrum of a sample comprising coaxial electrodes.

The apparatus comprises:
a pair of electrodes 116, 131, each electrode having a conducting surface;
a sample chamber configured to hold a sample between the conducting surfaces;
a controller configured to apply alternating voltages across the conducting surfaces at a range of different frequencies and to process the frequency response of the sample to determine the impedance spectrum of the sample; and
a conditioning system for applying a pressure to the sample.

The electrodes comprise an elongate inner electrode 131 and a cylindrical outer electrode formed by the metallic housing 116. These electrodes operate as a coaxial capacitor.

In this case, the PEEK plugs and end blocks are encased within a metal housing comprising plug channels 138, 139 and connector plates 140, 141. The housing 116, the plug channels 138, 139 and the connector plates 140, 141 form a closed cylinder which contains end blocks 134, 135, end plugs 114, 115, the central electrode 131 and space for the sample.

An optional flexible or resilient radial overburden sleeve allows a radial pressure to be applied to the sample. The radial overburden sleeve may be formed from metal (e.g., thin cylindrical tubes of stainless steel or aluminum).

A vector network analyzer may also be connected to this cell (from one or both ends) to measure the refection coefficient S11 and recover the saturation profiles simultaneously, while measuring the impedance frequency responses of the sample under test.

In this case, the fluid delivery system comprises a pump 122 for generating a pressure. The pressure in this case is applied to a piston cylinder 121 which injects fluid (e.g., water, hydrocarbon or other liquid or gas) into one end of the sample holder via a first port. Fluid is then drained from the sample holder 116 via the second port into a fluid collector reservoir 123. Back pressure is controlled via a back-pressure regulator 124.

The conditioning system in this case comprises an oven 128 for heating the sample. Other embodiments may comprise a cooler for cooling the sample.

The conditioning system also comprises pressure control. The pressure within the sample chamber can be controlled in three ways. The overburden system can exert axial and/or radial stresses on the sample; and the fluid delivery system can pressurize the sample by introducing more fluid into the sample holder (and controlling the backpressure).

The axial stress is provided by squeezing the plugs on either side of the sample holder. In this case, the sample apparatus is configured to move the plugs by injecting fluid into one or more overburden chambers on sides of the plugs 114, 115 which are opposite to the sample holder 116. The chambers lie between the plugs 114, 115 and end blocks 134, 135.

Each plug 114, 115 acts as a hydraulic ram which move in to apply a pressure to the sample. It will be appreciated that one or both plugs may have associated overburden chambers to apply axial pressure. In this case the fluid injected is typically electromagnetically neutral (e.g. canola oil) and/or have similar electromagnetic properties to that of the plugs (e.g. to minimize the presence of electromagnetic interfaces between the overburden fluid and the plug material).

PEEK plugs 114 and 115 have the drilled channels that allow the fluid to pass through them. These channels are aligned with the NPT ports of the 138 and 139. Also, 138 and 139 have one more NPT ⅛ port each. These are needed to fill up the overburden chamber around the sample with canola oil (or another neutral liquid) to squeeze the sample. These ports are also aligned with channels in plugs 114 and 115 that are drilled to allow oil to enter the space between the plug 114 and block 134 as well as plug 115 and block 135 to squeeze the sample axially. This is analogous to the overburden chamber of the previous embodiment. In addition, canola oil may be injected through the NPT ⅛ port into middle section 133 to squeeze the sample radially.

The radial stress is accomplished through the use of a resilient sheath 133 within the channel, and a pump configured to introduce fluid between the sheath and the channel to apply a lateral pressure on the sample within the sheath. In this case, the fluid is introduced into a port located centrally along the channel 116 as shown in FIG. 2b (see the raised portion with a hole shown in the upper half of the channel 116 in FIG. 2b). In this case, the resilient sheath is in the form of a metallic sleeve which 200° C. (in this case, the material is Viton™ rubber).

The material of the sleeve changed accordingly to the demands of each test. For example, the sleeve could be rubber (e.g., Viton™ rubber which can allow temperatures up to 200° C.). For higher temperatures Aflas™ rubber composite may be employed (up to 236° C.) and for more extreme test temperatures (up to 420° C.) Kalrez™ rubber or a metal sleeve may be used.

In this case, the axial and radial pressure may be controlled using compressed gas 125 (e.g., from a nitrogen cylinder) and a pressure regulator 126. Other embodiments may use a liquid pump to pump, for example, an electromagnetically neutral liquid such as canola oil.

Experimental Results

Figure 3A:
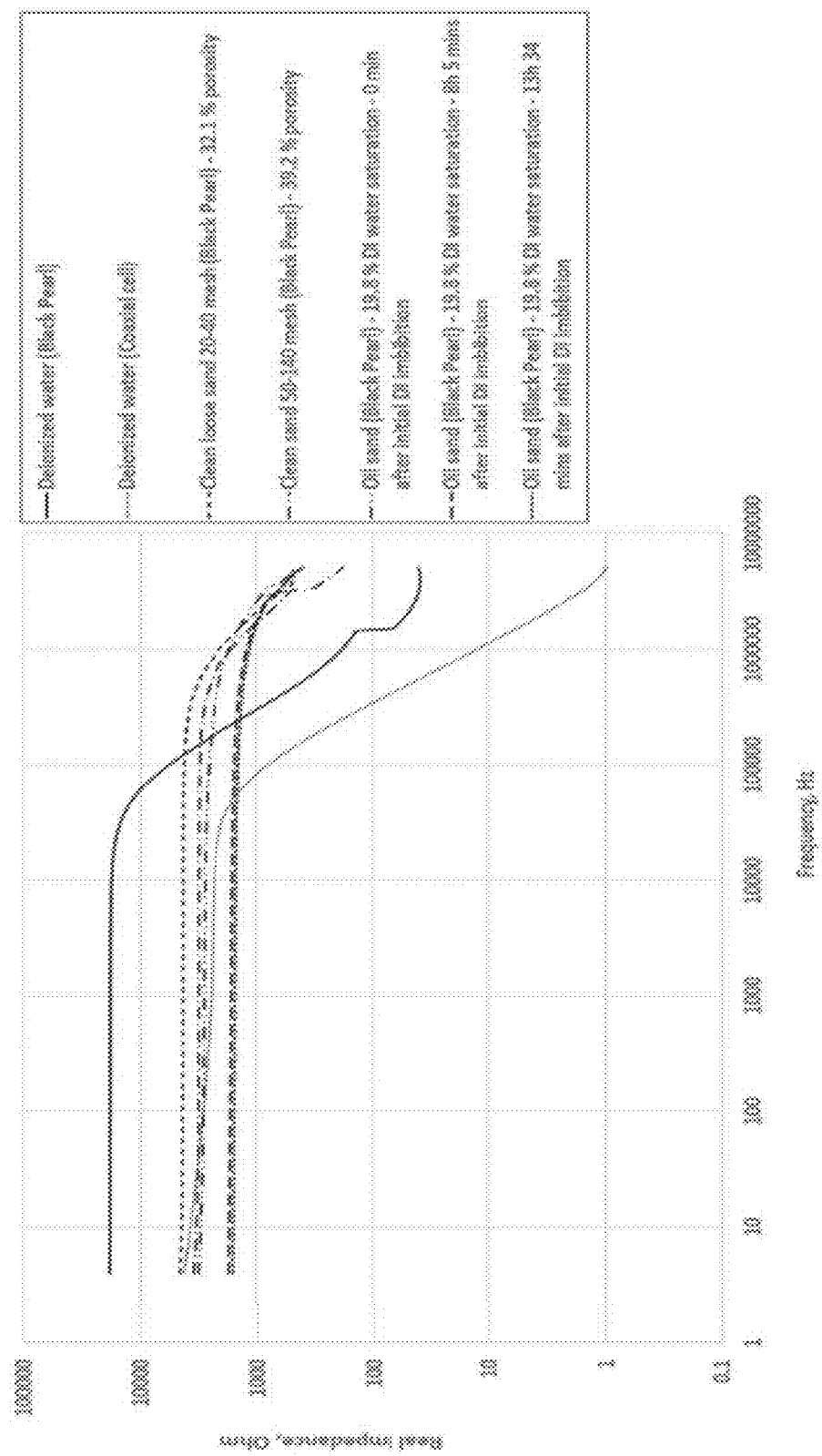
FIG. 3a is a graph of measured real impedance frequency responses of deionized water, fine and coarse clean loose sand and oil sand samples fully saturated with deionized water.
Figure 3B:
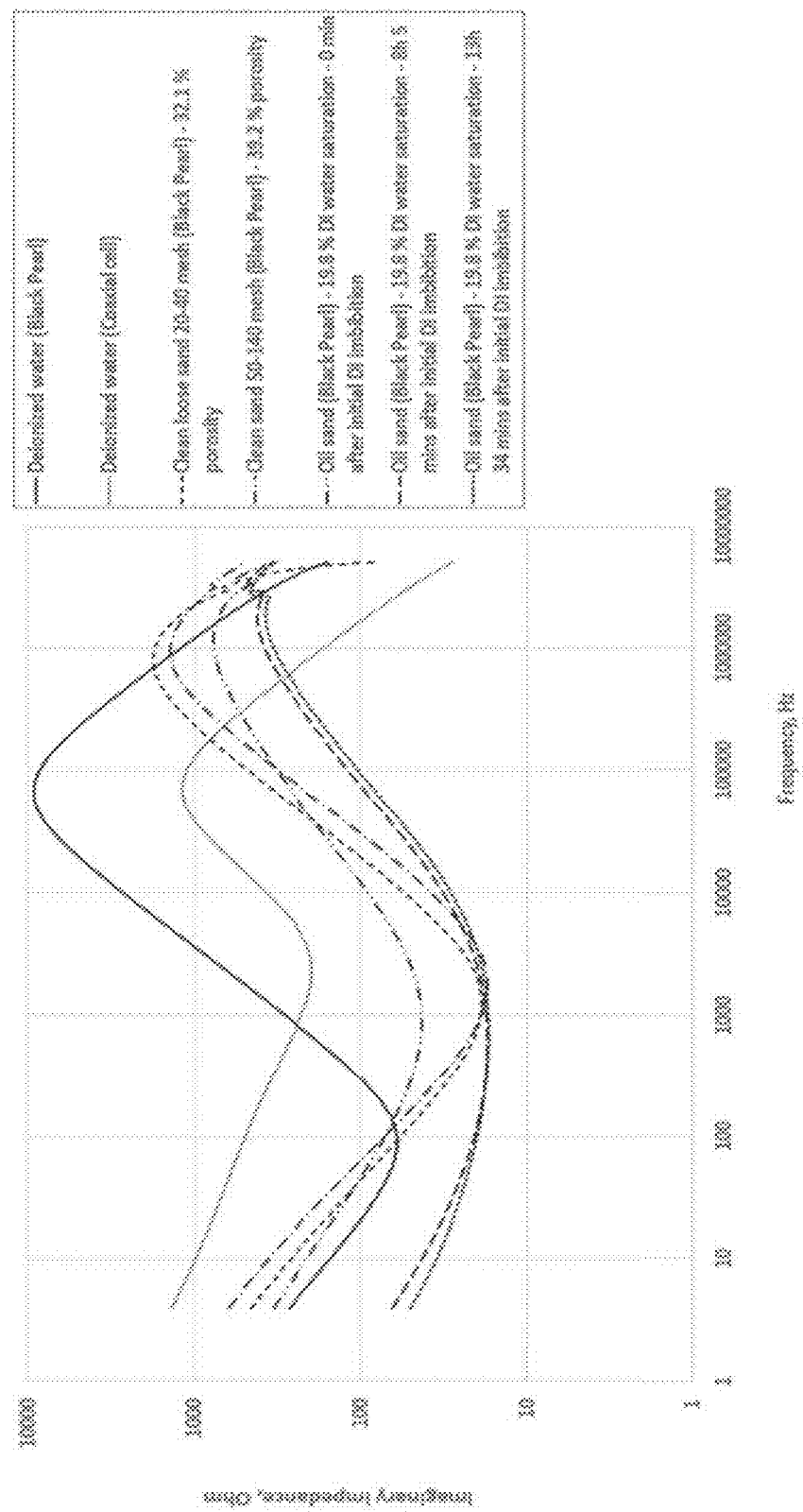
FIG. 3b is a graph of measured imaginary impedance frequency responses of deionized water, fine and coarse clean loose sand and oil sand samples fully saturated with deionized water.
Figure 3C:
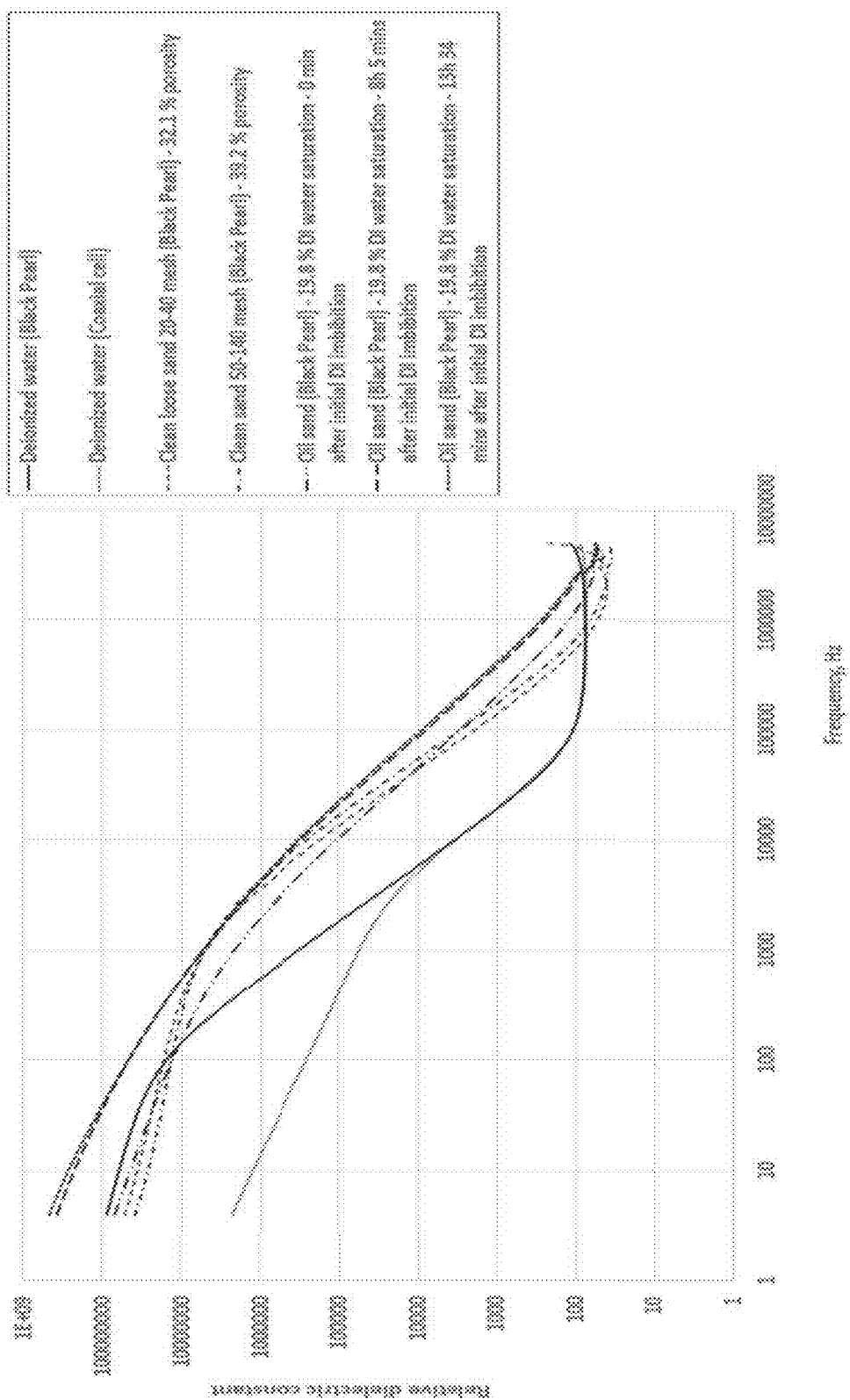
FIG. 3c is a graph of measured relative dielectric constant frequency responses of deionized water, fine and coarse clean loose sand and oil sand samples fully saturated with deionized water.
Figure 3D:
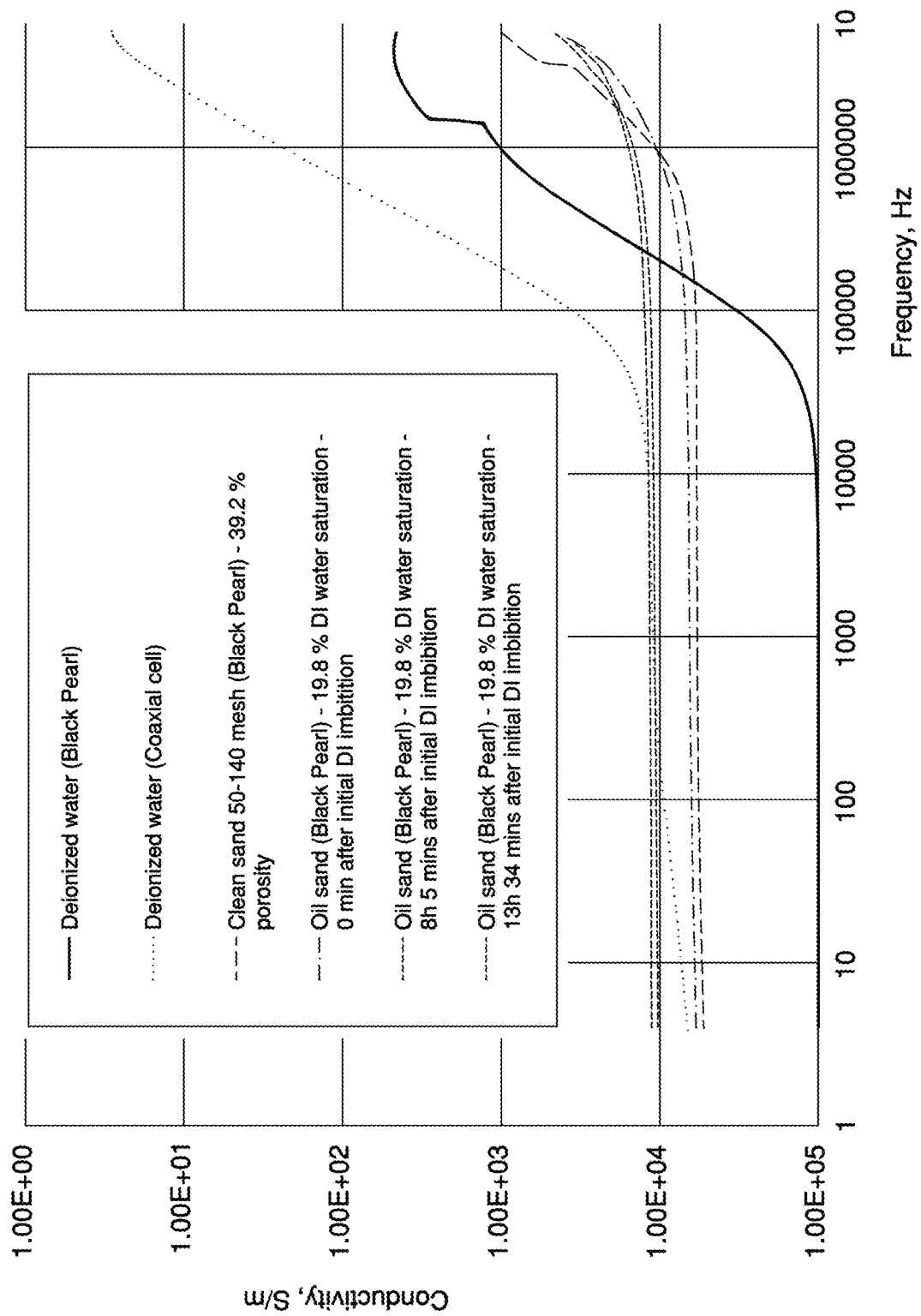
FIG. 3d is a graph of measured electrical conductivity frequency responses of deionized water, fine and coarse clean loose sand, and oil sand samples fully saturated with deionized water.
Figure 4A:
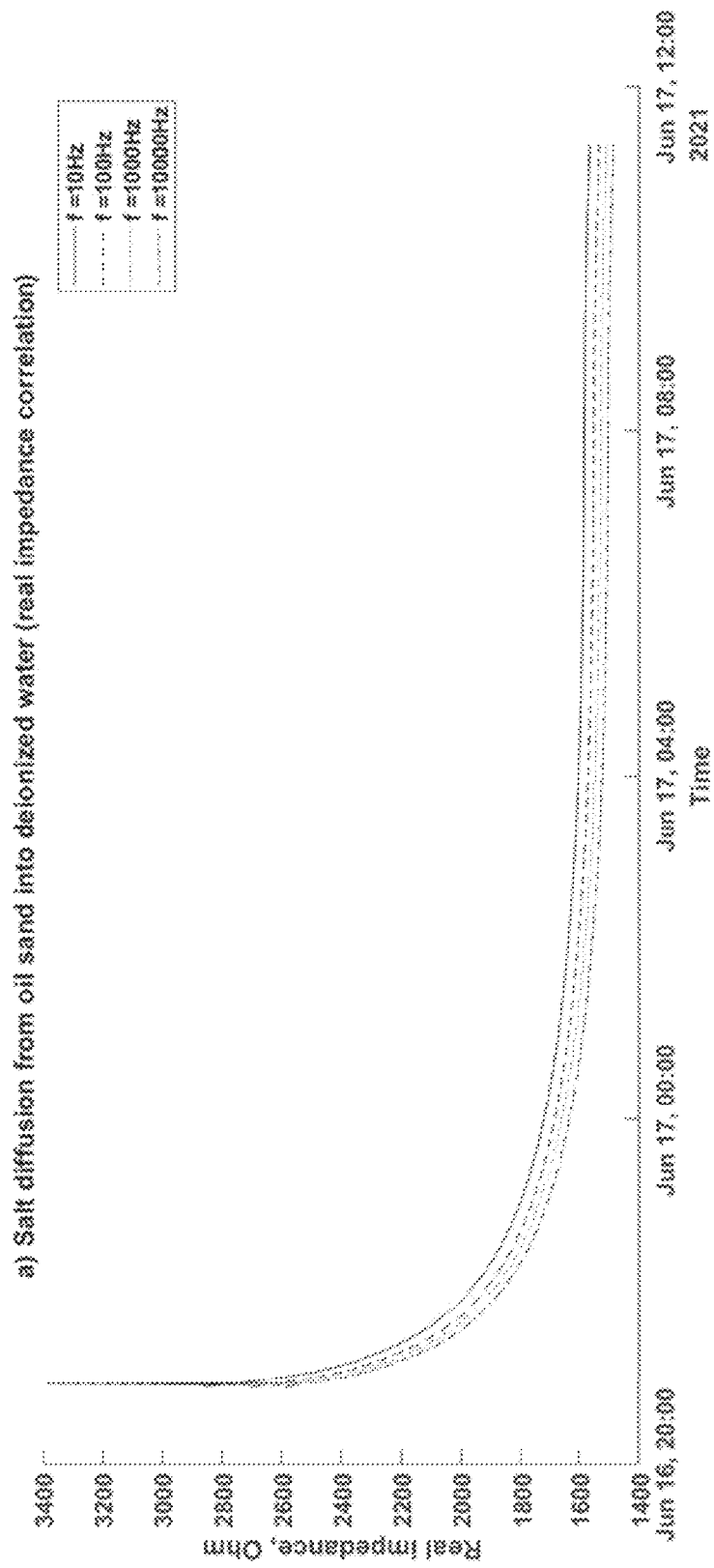
FIG. 4a-d are graphs that show kinetics measured in a parallel plate impedance cell of the in-situ oil sand salts diffusion into deionized water.
Figure 4B:
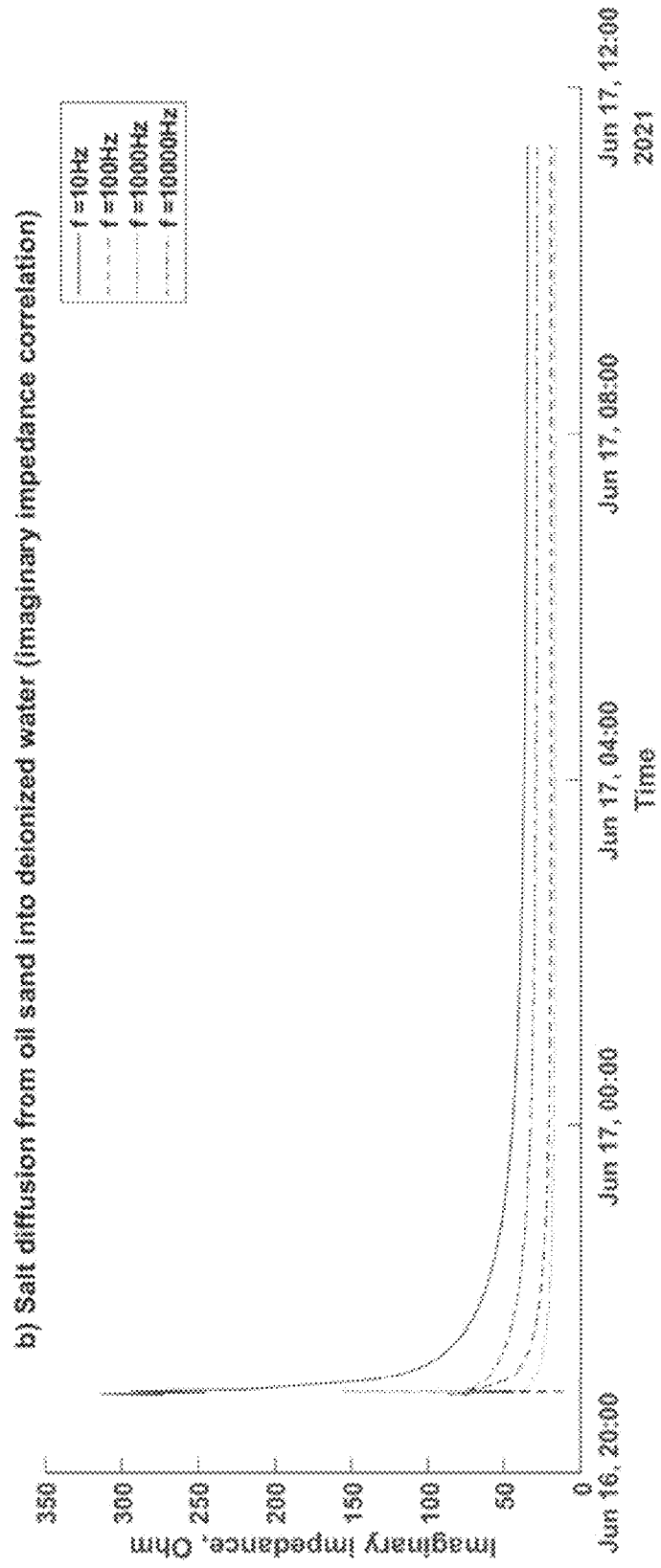
Figure 4C:
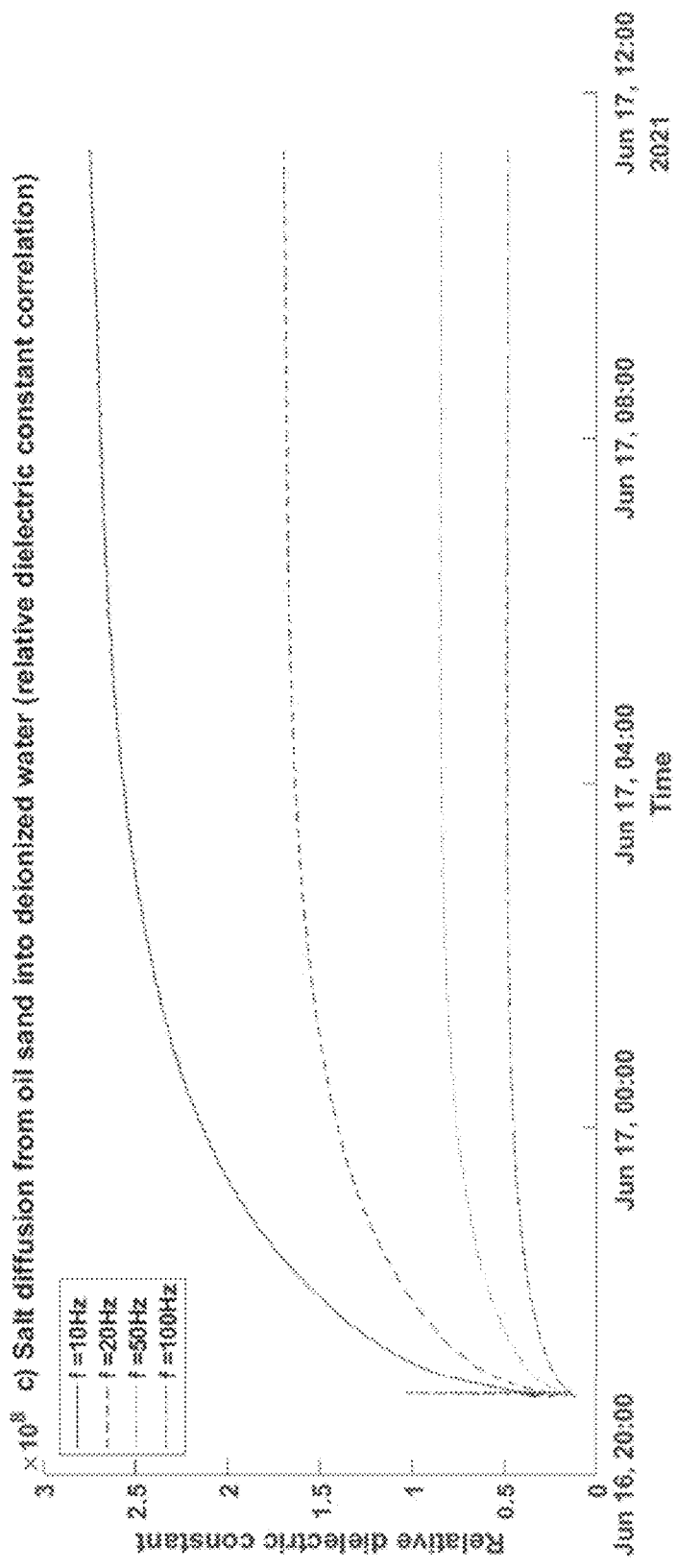
Figure 4D:
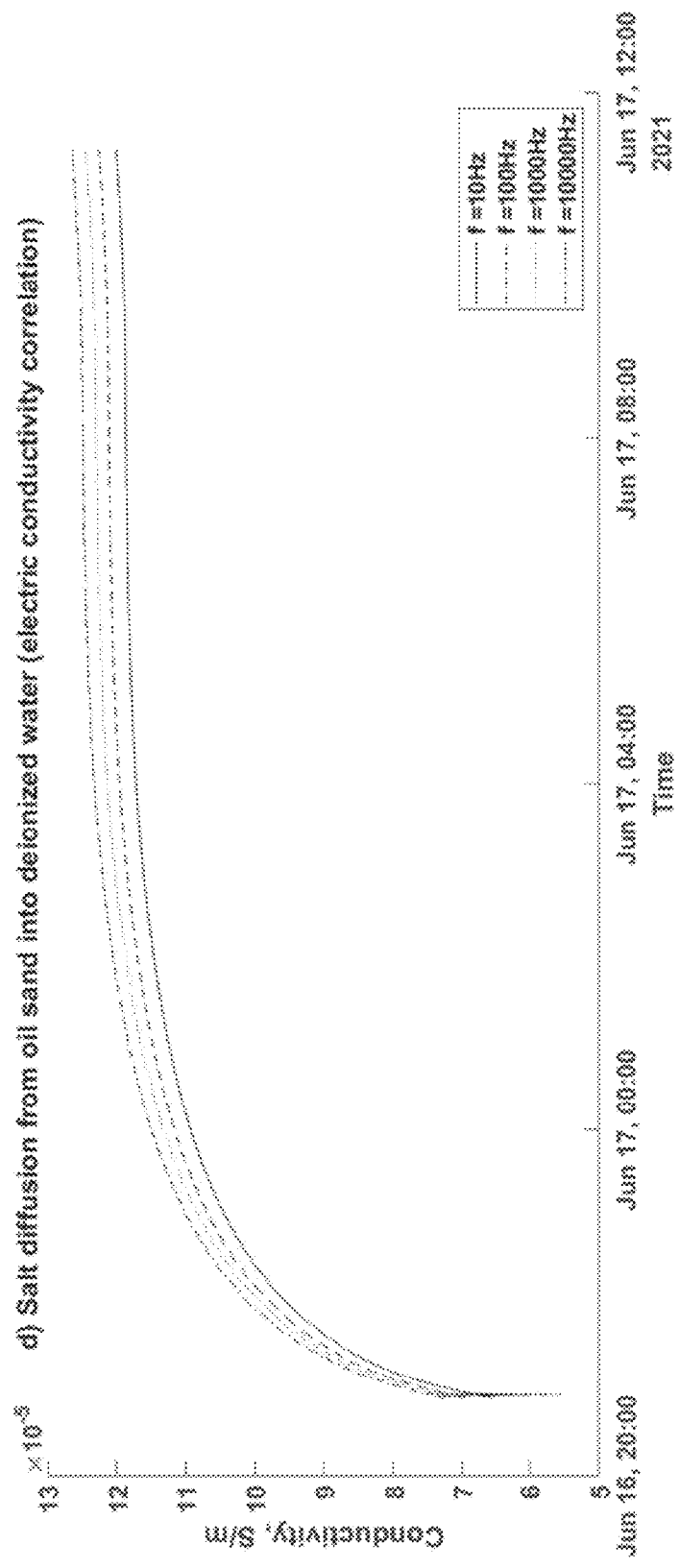

FIG. 3a is a graph of measured real impedance frequency responses of deionized water, fine and coarse clean loose sand and oil sand samples fully saturated with deionized water. Deionized water samples were measured with both the coaxial and parallel plate impedance cells FIG. 3b is a graph of measured imaginary impedance frequency responses of deionized water, fine and coarse clean loose sand and oil sand samples fully saturated with deionized water. Deionized water samples were measured with both the coaxial and parallel plate impedance cells FIG. 3c is a graph of measured relative dielectric constant frequency responses of deionized water, fine and coarse clean loose sand and oil sand samples fully saturated with deionized water. Deionized water samples were measured with both the coaxial and parallel plate impedance cells FIG. 3d is a graph of measured electrical conductivity frequency responses of deionized water, fine and coarse clean loose sand, and oil sand samples fully saturated with deionized water. Deionized water samples were measured with both the coaxial and parallel plate impedance cells.

The impedance measurements of deionized water, oil sand saturated with deionized water, clear sand of fine and coarse sands saturated with deionized water have been performed using the parallel plate impedance cell. Deionized water sample has also been measured using the coaxial electrode cell. The real and imaginary parts of the measured complex impedance responses are shown in FIG. 3a and FIG. 3b. The dielectric constant and conductivity frequency responses have been extracted from the real and imaginary parts of the measured impedance frequency responses using Equations 1-9 (see Theory section below) and are shown in FIG. 3c and FIG. 3d.

These resulting dielectric constant and conductivity responses are consistent with changes in water saturation values for different sand packs. These results are also in agreement with the previous measurements of oil sand samples at low pressure parallel plate systems. Conductivity systematic increase with water saturation in sand packs also agrees with the literature to date.

The larger values in the dielectric constant frequency responses at lower frequencies (<1 MHz), as opposed to much smaller values at higher frequencies, are due to electrode polarization. The electrode polarization is a well-known artifact of all impedance measurements, which is caused by the accumulation of ions present in the sample solution in the vicinity of the electrodes. There have been multiple ways proposed in the literature to eliminate this unwanted effect by using 4-electrode systems and some postprocessing algorithms. However, all these techniques have problems and, moreover, they do not allow measurements of the electrode polarization contribution. In contrast, the present system allows these effects to be measured by allowing the inter-electrode spacing to be adjusted.

Electromagnetic heating of rocks is usually accomplished by inserting the antennas into the wellbores and generating a specified voltage drop at specified frequency (both controlled by an inverter/RF generator) between their electrode couples. Once this voltage is applied, the steam chamber (dissection zone) around the wellbore and its antenna starts developing.

This dissection zone is likely to be non-uniform and get transformed during the heating process due to the heterogeneity in the spatial distribution of the fluid composition within the oil reservoir. This is likely to cause a reservoir temperature to change in cycles, which may need to be accounted for, when establishing the most EM efficient heating protocol.

Also, the EM heating antennas could potentially fail due to e.g., overheating several times during the EM heating operations, which would require the antennas to be replaced. During this replacement stage, the temperature of the oil reservoir would drop causing the uncertainties in dielectric properties of this reservoir.

The present apparatus and method could be used to mimic this scenario by performing the dielectric measurements of reservoir samples that undergo heating and cooling-off cycles.

The inventors have conducted a set of these cyclic experiments, where the oil sand sample, that was pre-saturated with deionized water, was packed between the parallel plate electrodes of the apparatus described herein. It was also subjected to an external heating via a heating tape, followed up by cooling-off periods. The overburden pressure was applied hydraulically with water via a piston-pump with a PID controller and was kept constant at 1000 psi through each cycle. The back pressure regulator was connected to the inlet/outlet of the impedance cell and was set at 540 psi. The impedance and dielectric frequency responses along with the sample pore pressure, overburden pressure and sample temperature were recorded during these cycles of heating and cooling-off (see FIGS. 18a-c, FIGS. 19a-c, FIGS. 20a-c). The dielectric constant and conductivity values at 80 kHz were extracted for each data set recorded and the pore pressure and temperature dependent relative dielectric constant and conductivity correlations were built (see FIGS. 15a-b, FIG. 16a-b).

A hysteresis is observed in both temperature and pore pressure correlations for both the relative dielectric constant and conductivity values at 80 kHz. This behaviour is consistent at all frequencies measured, however, 80 kHz frequency is shown here, since it is most used in the EM heating projects.

The change in dielectric properties is not linear with temperature or pore pressure and their values do not return to their initial states after each cycle. This is an extremely important observation, that could be leveraged to further improve protocols of the EM heating operations.

FIG. 4a-d are graphs that show kinetics measured in the parallel plate impedance cell of the in-situ oil sand salts diffusion into deionized water and constructed based on a) the real impedance frequency responses, b) the imaginary impedance frequency responses, c) the relative dielectric constant frequency responses, d) the electrical conductivity frequency responses for several frequencies. The apparatus is the most sensitive at the lowest measured frequency (at 4 Hz) due to the electrode polarization effect (the lowest frequency salt diffusion characteristics at 10 Hz are shown, but the point is the smaller the excitation frequency is, the longer the relaxation time of the ions in the solution becomes).

Kinetics of the diffusion process of the intrinsic salts from oil sand sample into deionized water, with which the oil sand sample was saturated to mobilize the salts it contains, was captured using the batch type system with the parallel plate capacitor cell. Four concentration characteristics have been built based upon the real and imaginary parts of the measured complex impedance as well as the recovered dielectric constant and conductivity frequency responses sampled at several frequencies over time. The most sensitive diffusion characteristic is the one that was sampled at the lowest frequency. This is due to the fact, that at the lowest frequency of the impedance measurement the ions present in the solution have the longest to realign themselves in response to the external alternating electric field supplied by the impedance analyzer.

The dissipation factor (DF) is defined as the value of the tendency of dielectric materials to absorb AC energy that is applied to it. The dissipation factor has the same definition as the loss tangent, but it is viewed from a different perspective. The loss tangent (see FIG. 5) is defined as the tangent of the difference of the phase angle between the capacitor voltage and capacitor current with respect to the theoretical 90-degree value anticipated. This difference is caused by the dielectric losses within the capacitor cell. The loss tangent is defined as the ratio between the losses that occur within the capacitor cell's material caused by either the dipole relaxation or conduction of electrons (or both, but one of them is usually predominant) phenomena and could be found as:

$$DF(f) = \text{loss tangent}(f) = \frac{2\pi f \epsilon''(f) + \sigma}{2\pi f \epsilon'(f)} = \frac{2\pi f \epsilon_r''(f)\epsilon_0 + \sigma \epsilon_0}{2\pi f \epsilon_r'}, \quad (1)$$

definitions of the variables used is given in the theory section. Higher dissipation factor (DF) of the material measured in a capacitor/impedance cell corresponds to higher rates of electromagnetic heating and vise versa. Therefore, it is crucial to know the shapes of the loss tangent frequency profiles at various thermobaric conditions and fluid compositions of the sample/material under test to optimize the electromagnetic heating of it and develop the most efficient heating protocol.

Theory

Figure 6A:
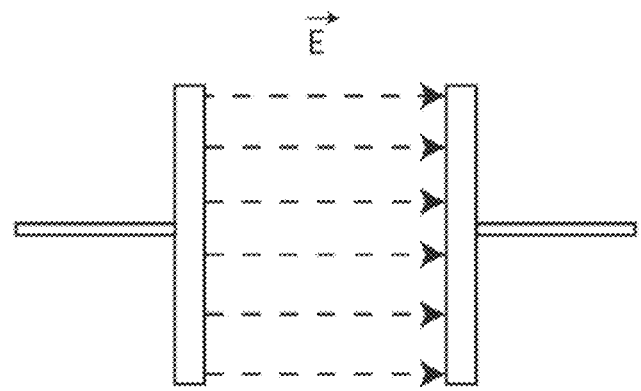
FIG. 6a is a simplified schematics of a parallel plate capacitor impedance cell showing the electric field distribution.
Figure 6B:
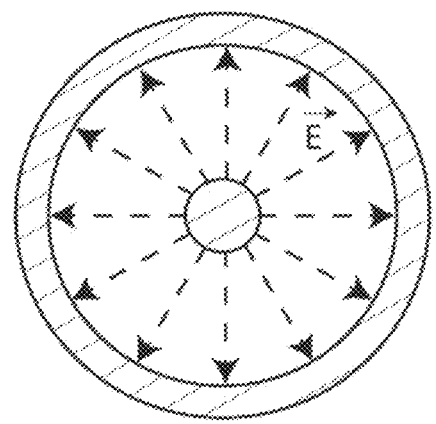
FIG. 6b is a simplified schematics of a coaxial impedance cell showing the electric field distribution.

Two simplified schematics of the parallel plate capacitor impedance cell and the coaxial impedance cell with the electric field distribution in them are shown in FIGS. 6a-b. The electric field $\vec{E}$ is excited from one of the plates (high potential electrode) of the parallel plate impedance cell (FIG. 6a) or from one of the cylindrical surfaces in the coaxial capacitor impedance cell (FIG. 6b) to an opposite electrode of different and/or near zero potential (low potential electrode). The electrode polarity may be reversed if needed and is invariant of the dielectric constant and conductivity frequency characteristics of the material under test.

Determining the impedance of a sample depends on the configuration of the conducting surfaces which are used to apply a voltage probe signal to the sample. Two of the geometry configurations include the parallel plate and coaxial shape.

The key dimensions required for the parallel plate embodiment are the outer diameter of the conducting surfaces, D, the outer diameter of the sample within the sample chamber (corresponding to the inner diameter of the ring inserts in the embodiment described above), d, and the inter-electrode spacing $L_{pp}$.

The key dimensions required for the coaxial embodiment are the inner radius of the outer conducting surface, b, and the outer radius of the inner conducting surface, a, and the length of the sample within the conducting surfaces $L_{coax}$. It will be appreciated that the sample will sit within the region between radii a and b.

A concept of the equivalent circuits is commonly used to recover dielectric material properties. It is assumed that the effect of the insertion of the sample between the place of the impedance cell may be modelled/represented by using a combination of resistors, capacitors and inductors. The following resistor-capacitor (RC) equivalent circuits are commonly used to extract dielectric properties from the parallel two-plate impedance cells.

Figure 7A:
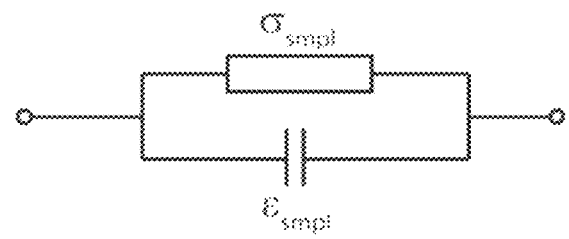
FIG. 7a is the equivalent electrical circuit for a parallel plate impedance cell.
Figure 7B:
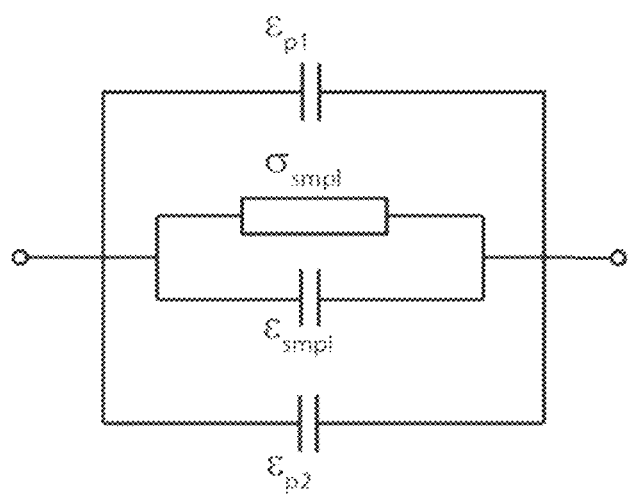
FIG. 7b is the equivalent electrical circuit for a coaxial impedance cell.

FIG. 7a is the equivalent electrical circuit for the parallel plate impedance cell. FIG. 7b is the equivalent electrical circuit for the coaxial impedance cell.

The following two sets of equations are used to extract dielectric constant and conductivity frequency responses based on the two equivalent circuits above and by using the Ohm's law. The complex impedance Z*(f) at a certain frequency f is given by:

$$Z^*(f) = Z'(f) + i \cdot Z''(f), \quad (2)$$

where Z'(f) is the real part of the measured impedance, Z"(f) is the imaginary part of the measured impedance, i is the imagianry unit number.

The complex dielectric constant $\epsilon^*(f)$ at a certaincy frequency f is associated with the conductivity and the real part of the dielectric constant $\epsilon'(f)$ in the following way:

$$\epsilon^*(f) = \epsilon'(f) + i \cdot \epsilon''(f) = \epsilon'(f) + i \cdot \frac{\sigma(f)}{2\pi f}, \quad (3)$$

where $\epsilon''(f)$ is the imaginary part of the dielectric constant.

The complex value of the relative dielectric constant $\epsilon_r^*(f)$ at a given frequency f is found as:

$$\epsilon_r^*(f) = \frac{\epsilon^*(f)}{\epsilon_0}, \quad (4)$$

where $\epsilon_0$ is the permettivity of free space.

The relative dielectric constant of the measured sample $\epsilon_{rsmpl}(f)$ and conductivity $\sigma_{smpl}(f)$ frequency responses for the parallel plate impedance cell are found as:

$$\epsilon_{rsmpl}(f) = \frac{1}{2\pi f \epsilon_0 Z''(f) A_{sh}}, \quad (5)$$

$$\sigma_{smpl}(f) = \frac{A_{sh}}{Z'(f)}, \quad (6)$$

where $A_{sh}$ is the geometrical factor that is calculated for the parallel plate impedance cell as:

$$A_{sh} = \frac{\pi d^2}{4 L_{pp}}, \quad (7)$$

where d is the diameter of the low potential electrode, $L_{pp}$ is the electrode spacing.

The relative dielectric constant of the measured sample $\epsilon_{rsmpi}$ (f) and conductivity $\sigma_{smpl}(f)$ frequency responses for the coaxial impedance cell are found as:

$$\epsilon_{rsmpl}(f) = \frac{\left(\frac{\ln\left(\frac{b}{a}\right)}{4\pi^2 \epsilon_0 f Z''(f)} - \epsilon_{rp1} L_{p1} - \epsilon_{rp2} L_{p2}\right)}{L_{coax}}, \quad (8)$$

$$\sigma_{smpl}(f) = \frac{1}{2\pi Z'(f) L_{coax}} \ln\left(\frac{b-a}{a}\right), \quad (9)$$

where $L_{p1}$ is the length of the first PEEK plug, $L_{p2}$ is the length of the second PEEK plug, $L_{coax}$ is the length of the sample loaded in the coaxial impedance cell, a is the radius of the inner conduction of the coaxial impedance cell, b is the radial distance between the center conductor of the coaxial impedance cell center to the outer shell of the cell.

Figure 8:
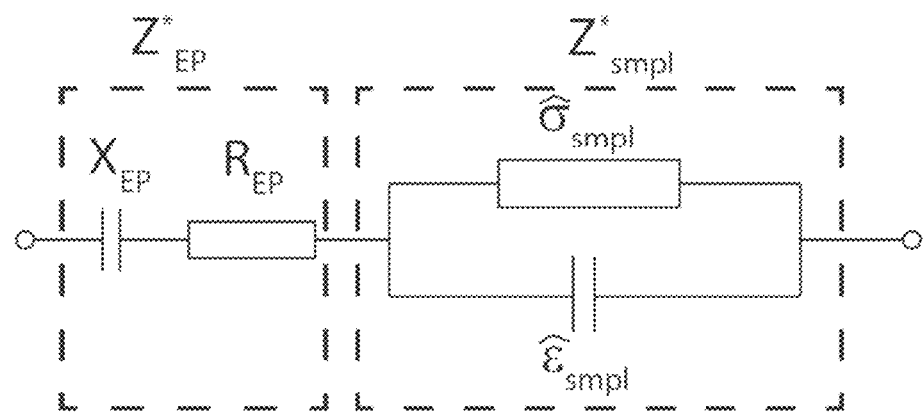
FIG. 8 is the equivalent electrical circuit for the parallel plate impedance cell with the electrode polarization effect included.

One important advantage of the parallel plate impedance cell geometry over the coaxial shape lays in the fact, that the electrode spacing is more easily varied in the parallel plate impedance cell as opposed to the coaxial cell geometry. This allows for the indirect measurement of the electrode polarization effect. FIG. 8 is the equivalent electrical circuit for the parallel plate impedance cell with the electrode polarization effect included. The equivalent circuit is employed to represent the complex impedance contribution of the polarized layer $Z_{EP}*$ near the electrode as the reactive capacitance $X_{EP}$ in series with the resistance $R_{EP}$ connected to the parallel RC circuit, which represent the sample's complex impedance $Z_{smpl}*$.

The following system of equations may be constructed for two arbitrary electrode spacing distances 1 and 2 as:

$$\begin{cases} Z'_1(f) = R_{EP}(f) + \dfrac{A_{sh1}}{\hat{\sigma}_{smpl}(f)}, \\ Z''_1(f) = X_{EP}(f) + \dfrac{1}{2\pi f \epsilon_0 \hat{\epsilon}_{smpl}(f) A_{sh1}}, \\ Z'_2(f) = R_{EP}(f) + \dfrac{A_{sh2}}{\hat{\sigma}_{smpl}(f)}, \\ Z''_2(f) = X_{EP}(f) + \dfrac{1}{2\pi f \epsilon_0 \hat{\epsilon}_{smpl}(f) A_{sh2}}, \end{cases} \quad (10-13)$$

where $Z_{1,2}'(f)$ is the real part of the sample impedance measured at two arbitrary different electrode spacing distances 1 and 2, $Z_{1,2}''(f)$ is the imaginary part of the sample impedance measured at two arbitrary different electrode spacing distances 1 and 2, $\hat{\epsilon}_{smpl}(f)$ is the relative dielectric constant frequency response of the measured material corrected for the electrode polarization effect, $\hat{\sigma}_{smpl}(f)$ is the conductivity frequency of the measured material corrected for the electrode polarization effect, $A_{sh1,2}$ is the shape factor of the parallel plate impedance cell at two distinct arbitrary electrode spacing distances 1 and 2.

After solving the system of equations 10-13 for the material dielectric properties $\hat{\epsilon}_{smpl}(f)$ and $\hat{\sigma}_{smpl}(f)$, one gets the following explicit equations:

$$\hat{\epsilon}_{smpl}(f) = \frac{A_{sh2} - A_{sh1}}{2\pi f A_{sh1} A_{sh2} \epsilon_0 (Z_1''(f) - Z_2''(f))}, \quad (14)$$

$$\hat{\sigma}_{smpl}(f) = \frac{A_{sh1} - A_{sh2}}{Z_1'(f) - Z_2'(f)}. \quad (15)$$

The Open/Short/Load calibration needs to be conducted on the impedance analyzer to remove the parasitic effects of the impedance cells. The Open standard is performed by measuring impedance of the air between the two electrodes. The Short standard is performed by placing one electrode against another or by connecting them directly with a wire and measuring the impedance of this system. The Load is performed by measuring the impedance of any material of known impedance.

There are many circuit configurations used to measure complex impedance responses of materials. Majority of these configurations are listed in the following sources published by the Keysight/Agilent Technologies and OMICRON Lab. However, there are two major methods, that are four- and two-terminal types of measurements. The most popular circuit used for the four-terminal impedance measurements is called the auto-balancing bridge method.

Figure 9:
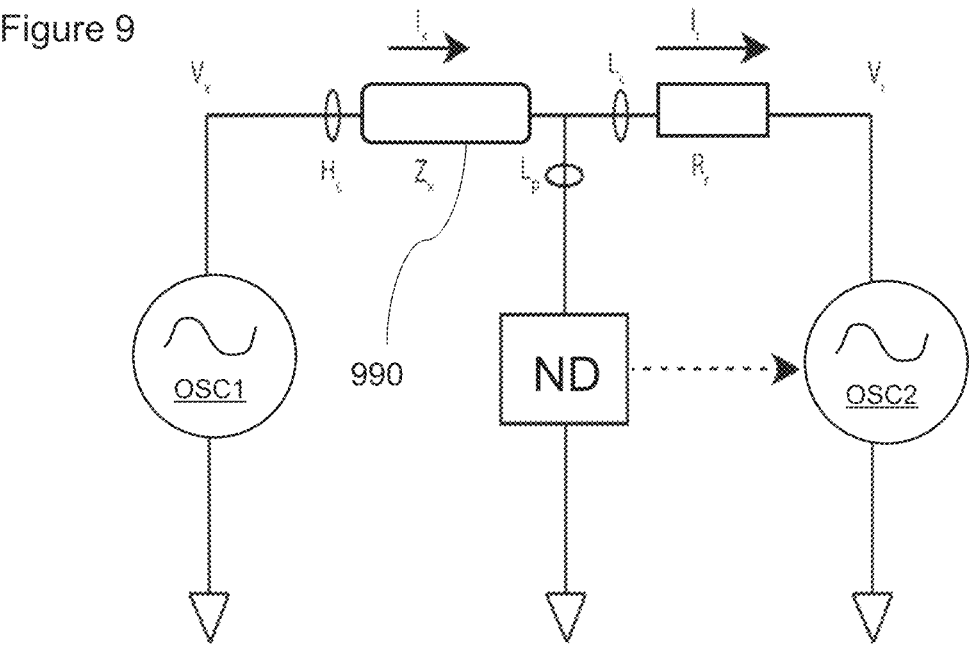
FIG. 9 is a schematic of an auto-balancing bridge circuit.

A schematic of of the auto-balancing bridge (four-terminal/Kelvin type configuration) is given in FIG. 9. The general work principal of the auto-balancing bridge is as follows. The operational I-V converter tries to balance the current that flows through the impedance cell, $I_x$, and the current that flows through the range resistor $R_r$ (see Equation 16). The potential between the impedance cell and the range resistor is maintained at zero volts by the null detector ND (this place of zero volts in the circuit is also called a virtual ground).

$$\frac{V_x}{Z_x} = I_x = I_r = \frac{V_r}{R_r}, \quad (16)$$

where $V_x$ is the voltage across the impedance cell (voltage measured at the high terminal), $Z_x$ is the impedance of the impedance cell, $V_r$ is the voltage across the range resistor. $H_c$ is the high current port, $H_p$ is the high potential port, $L_c$ is the low current port. Two oscillators OSC1, OSC2 are connected to $V_x$ and $V_r$. The impedance of the impedance cell being measured is calculated by using the Ohm's law as follow:

$$Z_x = \frac{V_x}{I_x} = R_r \frac{V_x}{V_r} \quad (17)$$

Figure 10:
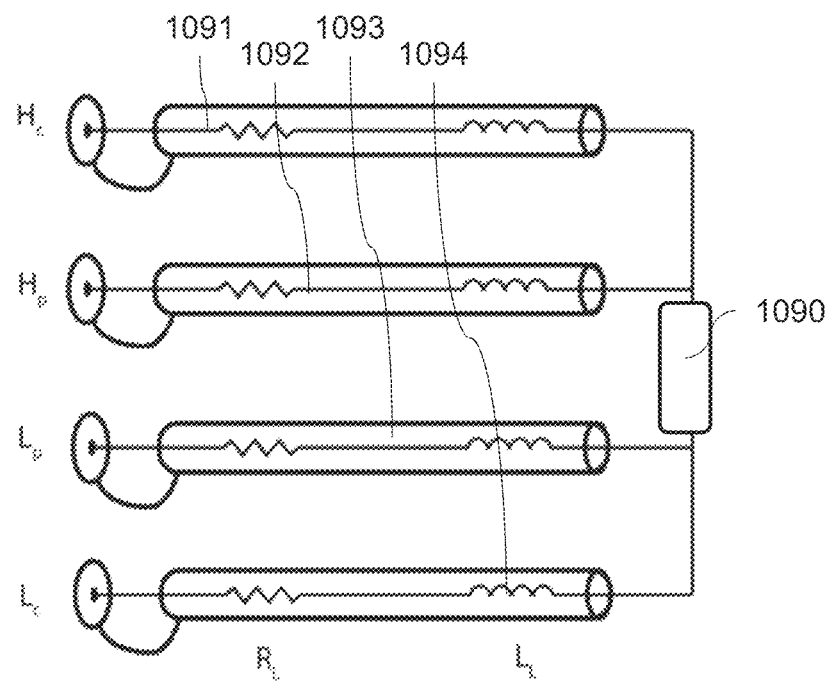
FIG. 10 is a schematic of a four-terminal/Kelvin type circuit providing connection between the impedance analyzer and the impedance cell.

FIG. 10 shows a four-terminal/Kelvin type connection of the impedance analyzer to the impedance cell/device under test: $H_c$ is the high current port, $H_p$ is the high potential port, $L_p$ is the low potential port, $L_c$ is the low current port.

The four terminal impedance measurements are also called Kelvin type impedance measurements. This measurement requires four wires or coaxial cables 1091-1094 to be connected to the impedance cell (or any other device under test) on their one end and to the impedance analyzer on its other end. Each wire or coaxial cable has a resistance, $R_L$, and an inductance, $L_L$. The use of the shielded coaxial cables is preferred due to the counterbalancing of the parasitic inductance.

Figure 11:
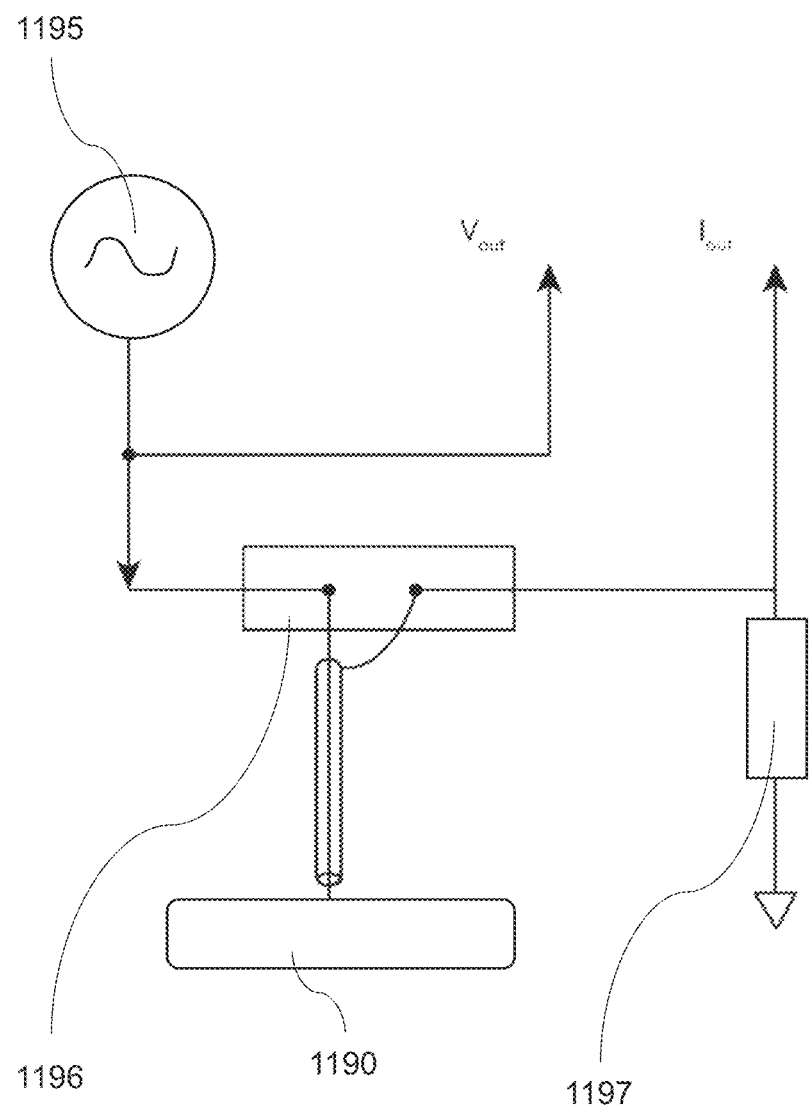
FIG. 11 is a schematic of a two-terminal circuit for measurements of the impedance cell.

FIG. 11 shows a two-terminal impedance measurements of the impedance cell using Bode 100 and the resistive bridge adapter (e.g. B-WIC).

This impedance measurement technique employs the combination of only two terminals with the resistive bridge (e.g., B-WIC impedance adapter). The signal of various frequencies within of the range of interest gets generated by the impedane analyzer's signal source 1195 (some variation of a oscillator circuit with transistors, usually proprietory) and passes through the resistive bridge 1196 and the impedance cell 1190 that is connected to it (see FIG. 23). The voltage across the impedance cell $V_{out}(f)$ and the current flowing through it $I_{out}(f)$ are measured the the receivers in the two-terminal impedance analyzer. A shunt resister provides an alternative route for the current to ground.

The resulting complex impedance is calculated by the Ohm's law as:

$$Z_{smpl}(f) = \frac{V_{out}(f)}{I_{out}(f)} \qquad (18)$$

Other Options

The technology may be applied to any field, where it is important to know the most basic electromagnetic properties of the materials used, which are the dielectric constant and conductivity as a function of temperature, wave frequency, fluid saturation and composition, pressure etc.

The present apparatus and method particularly suited to measure complex frequency responses of oil-bearing reservoir rock and fluid sample's impedance and dielectric permittivity.

The present technology may also be applied to monitor kinetics of phase changes in fluid and solid samples, diffusion, and dispersion processes, chemical reactions, and potentially other non-equilibrium processes.

The present technology may be applicable to applications in the food industry (e.g., by monitoring of the bacteria growth via sensing changes in the measured impedance responses), cosmetics (e.g., by measuring dielectric frequency responses and estimating particle size distribution) and medicine industries (e.g., by measuring change in hemoglobin body concentration in blood) as well.

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. An apparatus for determining the impedance spectrum of a sample, the apparatus comprising:
    a pair of electrodes, each electrode having a conducting surface;
    a sample chamber configured to hold a sample between the conducting surfaces;
    a conditioning system for applying a pressure to the sample within the sample chamber; wherein each electrode is housed within an electrically insulated piston, the pistons being configured to be moveable along an axis transverse to the conducing surfaces; and
    a controller configured to apply voltages across the conducting surfaces at a range of different frequencies and to process the frequency response of the sample to determine the impedance spectrum of the sample.

2. The apparatus according to claim 1, wherein the controller comprises an impedance analyzer.

3. The apparatus according to claim 1, wherein the controller comprises at least one of: direct current-voltage impedance analyzer; and an auto-balanced bridge impedance analyzer.

4. The apparatus according to claim 1, wherein the apparatus is configured to measure the impedance of the sample at frequencies between 1 kHz and 1 MHz.

5. The apparatus according to claim 1, wherein the controller acts as the heater by applying alternating current though the sample via the pair of electrodes.

6. The apparatus according to claim 1, wherein the heater has a power output of between 1 kW-10 kW.

7. The apparatus according to claim 1, wherein the sample chamber is configured to support pressures of over 10 MPa.

8. The apparatus according to claim 1, wherein the pair of electrodes comprise parallel plate electrodes arranged at either end of the sample chamber.

9. The apparatus according to claim 1, wherein the pair of electrodes are adjustable to change the distance between the conducting surfaces.

10. The apparatus according to claim 1, wherein the pair of electrodes comprise a cylindrical electrode and an axially located elongate electrode.

11. The apparatus according to claim 1, wherein the sample chamber comprises an inlet and an outlet to allow fluid to be circulated through the sample.

12. The apparatus according to claim 1, wherein the conditioning system comprises one or more overburden chambers, each overburden chamber being positioned adjacent to a moveable wall of the sample chamber, such that when the overburden chamber is filled, a pressure is applied within the sample chamber by moving the moveable wall.

13. The apparatus according to claim 1, wherein the conditioning system comprises a moveable wall forming part of the sample chamber and a hydraulic actuator configured to move the moveable wall to apply an overburden pressure to the sample within the sample chamber.

14. The apparatus according to claim 1, wherein the conditioning system comprises a heater for heating the sample.

15. A method of determining an impedance spectrum of a sample using the apparatus according to claim 1, the method comprising:
    inserting a sample between the conducting surfaces of a pair of electrodes;
    applying a pressure via the pistons to the sample using the conditioning system;
    using the controller to apply alternating voltages across the conducting surfaces at a range of different frequencies; and
    using the controller to process the frequency response of the sample to determine the impedance spectrum of the sample.

16. The method according to claim 15, wherein the method comprises changing the distance between the conducting surfaces to a new inter-surface distance and reapplying the alternating voltages and re-determining the impedance spectrum of the sample for the new inter-surface distance.

17. The method according to claim 15, wherein the method comprises recycling fluids through the sample and continuously reapplying the alternating voltages and re-determining the impedance spectrum of the sample.

18. The method according to claim 15, wherein the method comprises changing the temperature and pressure of the sample and continuously reapplying the alternating voltages and re-determining the impedance spectrum of the sample.

19. The method according to claim 15, wherein the method comprises injecting different fluids into a porous solid sample and continuously reapplying the alternating voltages and re-determining the impedance spectrum of the sample with different fluids.

20. The method according to claim 15, wherein the method comprises measuring and online monitoring the hysteresis in the pressure and temperature dependent relative dielectric constant and conductivity frequency responses of samples.

21. The method according to claim 15, wherein the method comprises calculating and online monitoring electrode polarization effects in the parallel plate impedance cell.

* * * * *